(12) United States Patent
Buda et al.

(10) Patent No.: US 11,156,572 B2
(45) Date of Patent: Oct. 26, 2021

(54) APPARATUSES, METHODS AND SYSTEMS FOR COMFORT AND ENERGY EFFICIENCY CONFORMANCE IN AN HVAC SYSTEM

(71) Applicant: Schneider Electric USA, Inc., Andover, MA (US)

(72) Inventors: Paul Robert Buda, Raleigh, NC (US); Larry A. Turner, Cary, NC (US); Scott Robert Brown, Wake Forest, NC (US); Gary Brent Pollard, Wendell, NC (US); David R. Glasgow, Wendell, NC (US); Jason Pazis, Cambridge, MA (US)

(73) Assignee: Schneider Electric USA, Inc., Andover, MA (US)

( * ) Notice: Subject to any disclaimer, the term of this patent is extended or adjusted under 35 U.S.C. 154(b) by 461 days.

(21) Appl. No.: 14/956,139

(22) Filed: Dec. 1, 2015

(65) Prior Publication Data

US 2016/0223216 A1 Aug. 4, 2016

Related U.S. Application Data

(60) Provisional application No. 62/110,398, filed on Jan. 30, 2015, provisional application No. 62/110,344, (Continued)

(51) Int. Cl.
*G01N 25/18* (2006.01)
*G05D 23/19* (2006.01)
(Continued)

(52) U.S. Cl.
CPC .............. *G01N 25/18* (2013.01); *F24F 11/30* (2018.01); *F24F 11/62* (2018.01); *G05B 13/021* (2013.01);
(Continued)

(58) Field of Classification Search
None
See application file for complete search history.

(56) References Cited

U.S. PATENT DOCUMENTS

| 4,475,685 A | 10/1984 | Grimado |
| 5,115,967 A | 5/1992 | Wedekind |
| (Continued) | | |

FOREIGN PATENT DOCUMENTS

WO  WO 02054165 A2  7/2002

OTHER PUBLICATIONS

International Search Report for PCT/US2016/015748 dated May 23, 2016.
(Continued)

*Primary Examiner* — Mohammad Ali
*Assistant Examiner* — Saad M Kabir
(74) *Attorney, Agent, or Firm* — Locke Lord LLP

(57) ABSTRACT

A processor-implemented method of controlling an HVAC system transforms a comfort map into a plurality of sequential constant-temperature segments that are used in generating a control temperature sequence that preserves occupant comfort while improving energy efficiency. The method balances user comfort, temperature trajectory execution complexity, operational HVAC trajectory realization, and energy efficiency. The system achieves this balance through utilization of comfort map metric data, analysis and control system execution. The system, comfort map metric data processing and analysis facilitates this balance by executing a control temperature sequence/temperature trajectories developed based on direct user comfort feedback data within the context of a comfort map and thermal equilibrium boundaries derived from the comfort map.

23 Claims, 22 Drawing Sheets

Related U.S. Application Data filed on Jan. 30, 2015, provisional application No. 62/110,393, filed on Jan. 30, 2015, provisional application No. 62/110,386, filed on Jan. 30, 2015, provisional application No. 62/110,379, filed on Jan. 30, 2015.

(51) Int. Cl.
| | |
|---|---|
| *G05B 15/02* | (2006.01) |
| *F24F 11/30* | (2018.01) |
| *F24F 11/62* | (2018.01) |
| *G05B 13/02* | (2006.01) |
| *F24F 110/10* | (2018.01) |
| *F24F 110/20* | (2018.01) |
| *F24F 140/60* | (2018.01) |
| *F24F 130/00* | (2018.01) |
| *F24F 130/10* | (2018.01) |
| *F24F 11/63* | (2018.01) |
| *F24F 11/58* | (2018.01) |

(52) U.S. Cl.
CPC ......... *G05B 15/02* (2013.01); *G05D 23/1917* (2013.01); *F24F 11/58* (2018.01); *F24F 11/63* (2018.01); *F24F 2110/10* (2018.01); *F24F 2110/20* (2018.01); *F24F 2130/00* (2018.01); *F24F 2130/10* (2018.01); *F24F 2140/60* (2018.01); *G05B 2219/2642* (2013.01)

(56) References Cited

U.S. PATENT DOCUMENTS

| | | |
|---|---|---|
| 6,478,233 B1 | 11/2002 | Shah |
| 7,130,719 B2 | 10/2006 | Ehlers |
| 8,352,082 B2 | 1/2013 | Parker |
| 8,584,030 B2 | 11/2013 | Laycock et al. |
| 2003/0217143 A1 | 11/2003 | Dudley |
| 2004/0262409 A1* | 12/2004 | Crippen ............... F24F 11/006 236/49.3 |
| 2007/0191987 A1 | 8/2007 | Dang et al. |
| 2009/0065596 A1 | 3/2009 | Seem et al. |
| 2010/0262298 A1 | 10/2010 | Johnson et al. |
| 2011/0160913 A1 | 6/2011 | Parker |
| 2012/0259469 A1* | 10/2012 | Ward ..................... G05B 15/02 700/276 |
| 2013/0085616 A1 | 4/2013 | Wenzel |
| 2014/0222221 A1 | 8/2014 | Boll et al. |
| 2014/0277765 A1 | 9/2014 | Karimi et al. |
| 2014/0358291 A1 | 12/2014 | Wells |

OTHER PUBLICATIONS

Written Opinion for PCT/US2016/015748 dated May 23, 2016.
Karer G. et al: "Predictive Control of Temperature in a Batch Reactor with Discrete Inputs," Intelligent Control, 2005. Proceedings of the 2005 IEEE International Symposium on, Mediterrean Conference on Control and Automation Limassol, Cyprus Jun. 27-29, 2005, Piscataway, NJ, USA, IEEE, Jun. 27, 2005 (Jun. 27, 2005), pp. 855-860, XP010817135. The entire document.
European Search Report for EP 16153477 dated Nov. 15, 2016.
European Search Opinion for EP 16153477 dated Nov. 15, 2016.
International Search Report for PCT/US2016/015745 dated Mar. 31, 2016.
Written Opinion for PCT/US2016/015745 dated Mar. 31, 2016.

\* cited by examiner

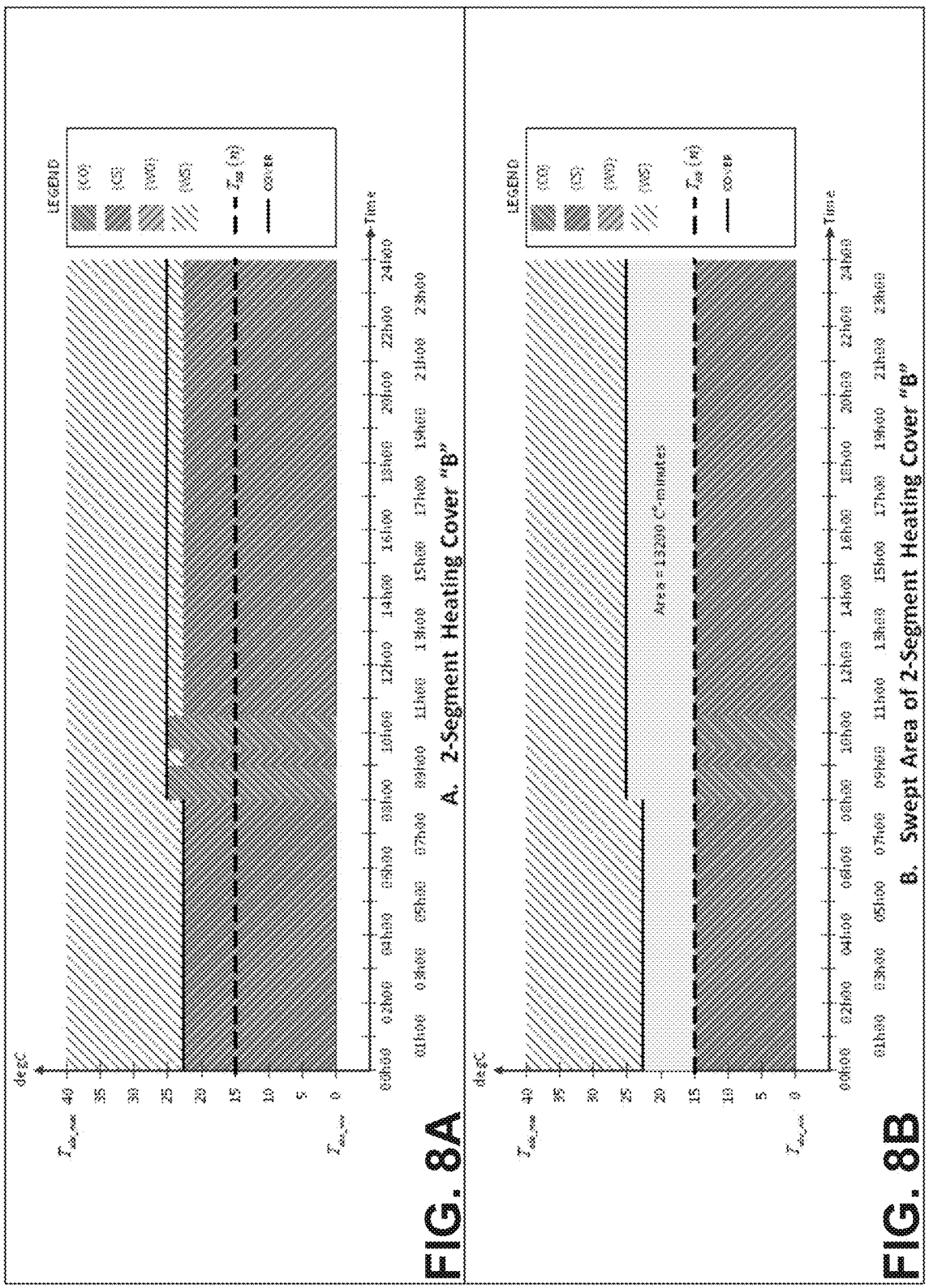

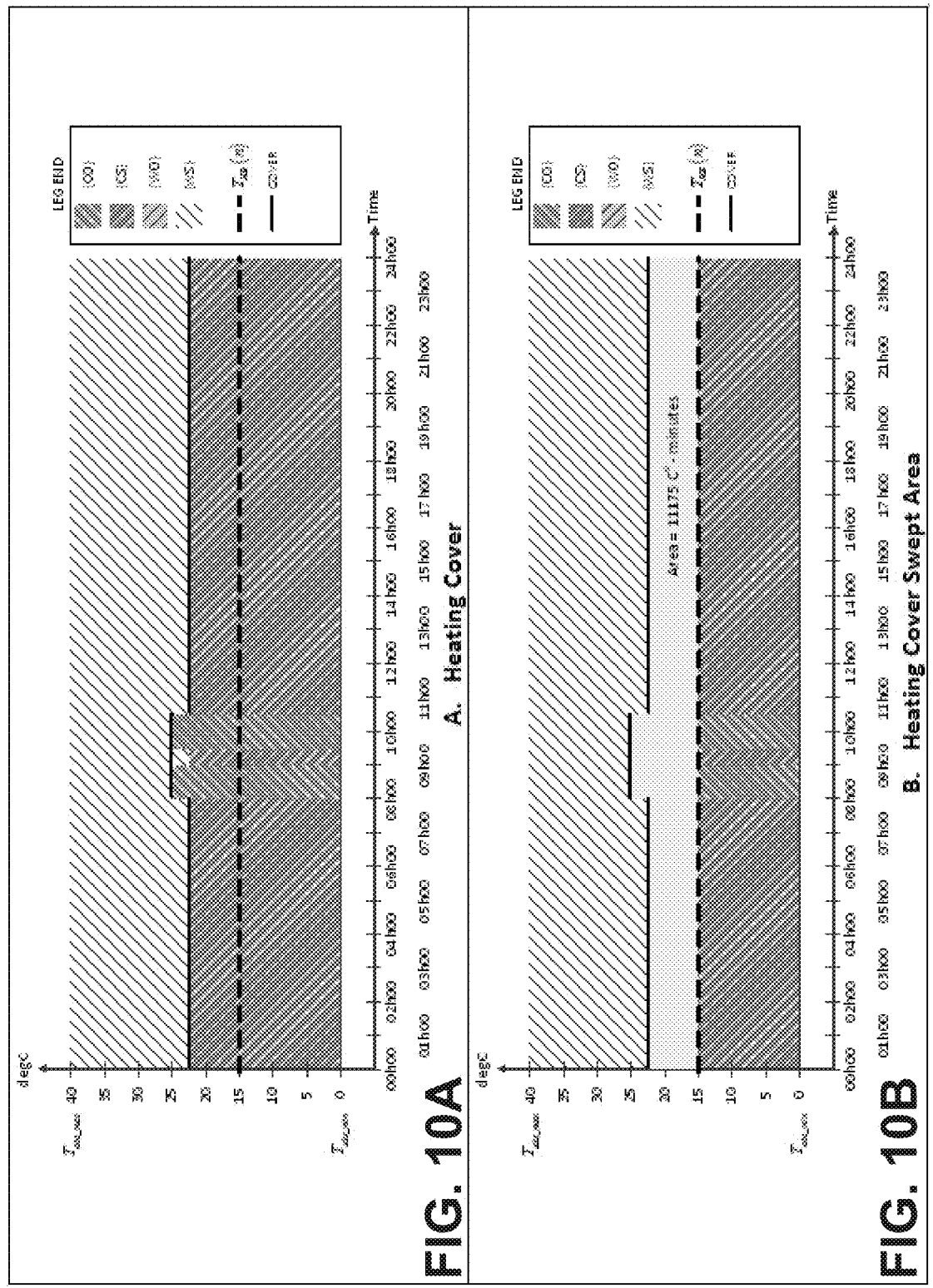

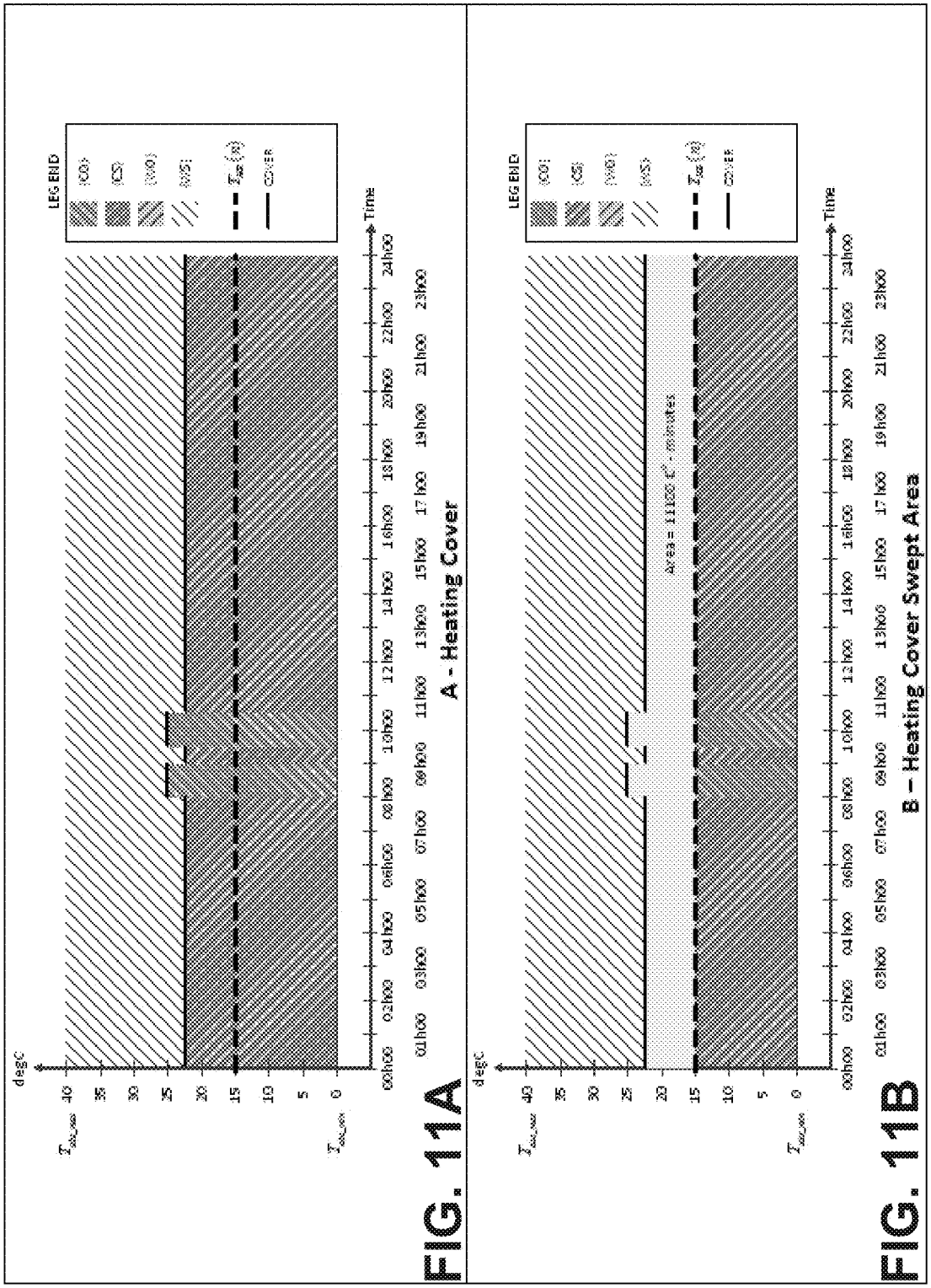
FIG. 11A  A - Heating Cover
FIG. 11B  B - Heating Cover Swept Area

US 11,156,572 B2

APPARATUSES, METHODS AND SYSTEMS FOR COMFORT AND ENERGY EFFICIENCY CONFORMANCE IN AN HVAC SYSTEM

This application claims the benefit of each of the following applications: (a) U.S. Provisional Application No. 62/110,393, filed Jan. 30, 2015 and titled "Interior Comfort HVAC User-Feedback Control System and Apparatus"; (b) U.S. Provisional Application Ser. No. 62/110,344, filed Jan. 30, 2015 and titled "Interior User-Comfort Energy Efficiency Modeling and Control Systems and Apparatuses"; (c) U.S. Provisional Application Ser. No. 62/110,386, filed Jan. 30, 2015 and titled "Interior Volume Thermal Modeling and Control Apparatuses, Methods and Systems"; (d) U.S. Provisional Application Ser. No. 62/110,398, filed Jan. 30, 2015 and titled "Apparatuses, Methods and Systems for Comfort and Energy Efficiency Conformance in an HVAC System"; and (e) U.S. Provisional Application Ser. No. 62/110,379, filed Jan. 30, 2015 and titled "Operational Constraint Optimization Apparatuses, Methods and Systems"; the entire contents of each of the aforementioned applications are herein expressly incorporated by reference.

This application for letters patent document discloses and describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

RELATED APPLICATIONS

This application is related to and hereby incorporates the following applications by reference:

U.S. application Ser. No. 14/956,082, filed Dec. 1, 2015 and titled "Interior Comfort HVAC User-Feedback Control System and Apparatus,"

U.S. application Ser. No. 14/956,227, filed Dec. 1, 2015 and titled "Interior User-Comfort Energy Efficiency Modeling and Control Systems and Apparatuses,"

U.S. application Ser. No. 14/955,971, filed Dec. 1, 2015 and titled "Interior Volume Thermal Modeling and Control Apparatuses, Methods and Systems," and U.S. application Ser. No. 14/956,019, filed Dec. 1, 2015 and titled "Operational Constraint Optimization Apparatuses, Methods and Systems."

The entire contents of each of the aforementioned applications are herein expressly incorporated by reference.

BACKGROUND

"Smart" thermostats are increasing in capability as well as in popularity among consumers, but they often have interfaces that are too complex for users to voluntarily interact with. Users often either leave an existing thermostat schedule unchanged, or override it altogether. As a result, the capabilities of many smart thermostats are not fully exploited.

BRIEF DESCRIPTION OF THE DRAWINGS

The accompanying appendices and/or drawings illustrate various non-limiting, example, inventive aspects in accordance with the present disclosure:

FIG. 8A shows a further two-segment heating cover, according to some embodiments;

FIG. 8B shows a swept area of the two-segment heating cover of FIG. 8A;

FIG. 10A shows a further three-segment heating cover, having a minimum swept area, according to some embodiments;

FIG. 10B shows the swept area of the three-segment heating cover of FIG. 10A;

FIG. 11A shows a five-segment, "optimal" heating cover, according to some embodiments;

FIG. 11B shows a swept area of the five-segment heating cover of FIG. 11A;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

In some embodiments, the APPARATUSES, METHODS AND SYSTEMS FOR COMFORT AND ENERGY EFFI- CIENCY CONFORMANCE IN AN HVAC SYSTEM as disclosed herein transforms a set of reference temperature data (e.g., a "comfort map") into a plurality of sequential constant-temperature segments that are used in generating a control temperature sequence that preserves occupant comfort while improving energy efficiency.

There are many ways to develop a thermostat execution temperature trajectory/sequence. A system described in this application discusses methods of developing and executing a thermostat execution temperature trajectory that balances user comfort, temperature trajectory execution complexity, operational HVAC trajectory realization, and energy efficiency. The system achieves this balance through utilization of comfort map metric data, analysis and control system execution. The system, comfort map metric data processing and analysis facilitates this balance by executing a control temperature sequence/temperature trajectories developed based on direct user comfort feedback data within the context of a comfort map and thermal equilibrium boundaries derived from the comfort map.

Figure 1:
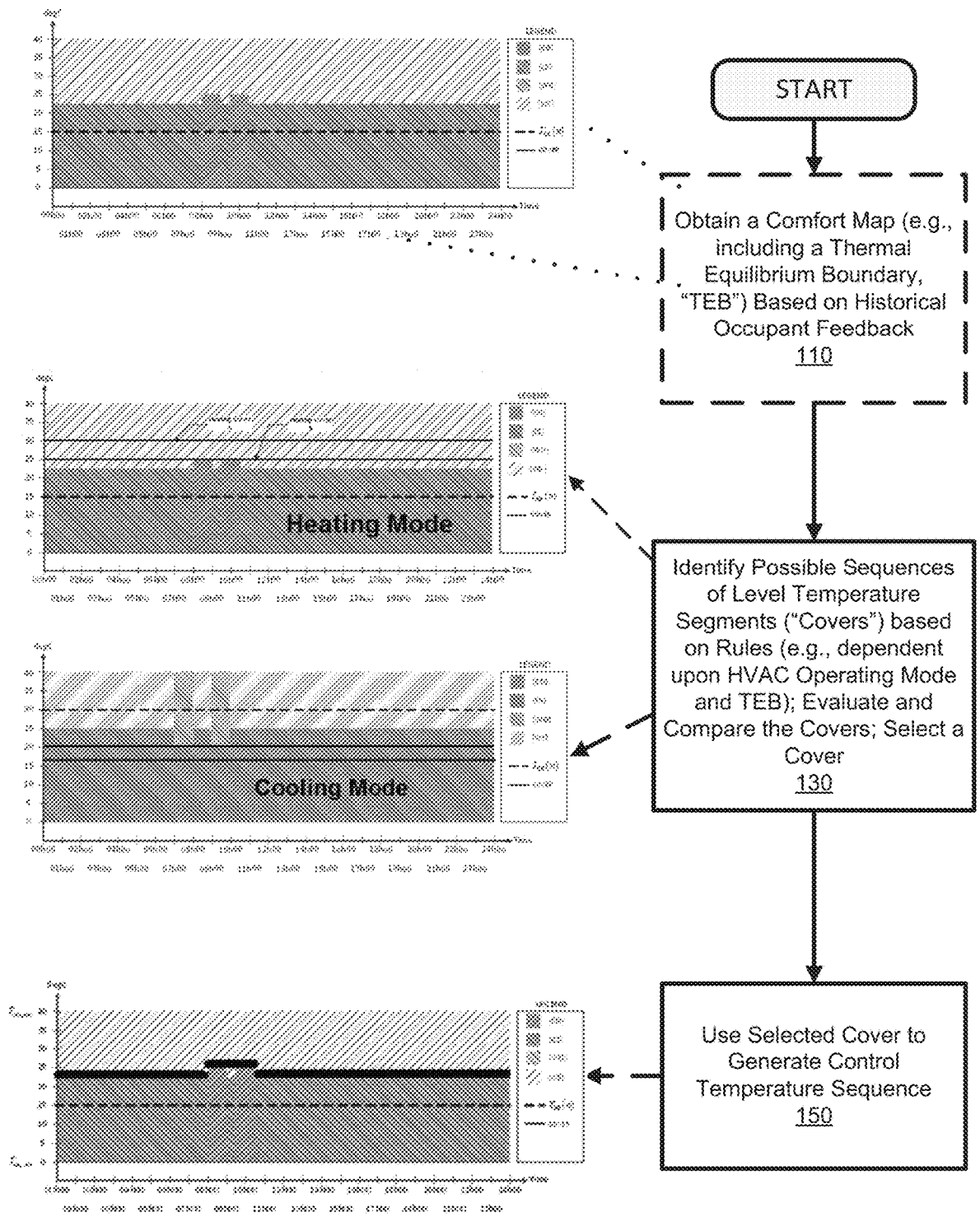
FIG. 1 is a pictorial/flow diagram illustrating a process flow according to some embodiments.

Comfort maps and direct user comfort feedback data processing and analysis are described in greater detail in related patent application Ser. No. 14/956,082, which is hereby incorporated by reference. For illustrative purposes and to facilitate understanding of the system described herein, a "comfort map" is a graphical representation of time, temperature and comfort characteristics quantifying interactions between a user of an HVAC system and the HVAC system itself (e.g., via a thermostat). Examples of a comfort map are shown in FIG. 1. A user (hereinafter referred to as an "occupant," as he may be an occupant of an interior space being conditioned by the HVAC system), in some embodiments, interacts with the HVAC system through qualitative, categorical, direct user comfort feedback data—"subjective" indications that he is "too warm" (a "MINUS" event) or "too cool" (a "PLUS" event). For example, direct user comfort feedback data may be received via a pushbutton interface, smartphone app, or the thermostat display itself, during what may be referred to as a "comfort event." In turn, the thermostat (or any device in communication therewith, hereinafter "the system" or "the thermostat") may generate a two-dimensional representation, in a time-temperature parameter space, with regions, elements or sets of time-temperature parameter space that the occupant perceives to be "cool" and regions that the occupant may consider "warm". This two-dimensional representation is the "comfort map" and also includes comfort characteristic data. The comfort map can define comfort characteristic data as a "warm" upper region $\{W\}$ defined by one or more temperatures above which the system either knows with some certainty (via a previous comfort event), or models (e.g., via projections or estimates based on data elsewhere in the comfort map) that an occupant will perceive to be warm. Similarly, the comfort map can define comfort characteristic data as a "cool" lower region $\{C\}$ defined by one or more temperatures below which the system either knows with some certainty (via a previous comfort event), or models (e.g., via projections or estimates based on data elsewhere in the comfort map) that an occupant will perceive to be cool. In some implementations, the comfort map metric data includes comfort characteristic data for the elements or points on the comfort map. Also, for some implementations, the comfort map metric data includes additional comfort characteristic set and/or subset data. For example, set $\{W\}$ may include one or more subsets such as $\{WO\}$ that includes warm elements set by the occupant and/or $\{WS\}$ that includes warm elements set by the system. Similarly, set $\{C\}$ may include one or more subsets such as $\{CO\}$ that includes cool elements set by the occupant and/or $\{CS\}$ that includes cool elements set by the system. It is to be understood that additional or alternate subsets may be implemented.

In some implementations, the comfort map metric data includes comfort set rules that are used to help develop the proposed covers (described in greater detail below). Whether a temperature element or region considered "cool" or considered "warm" is also considered subjectively comfortable can depend upon the mode of the system, either heating or cooling. In one example, the comfort set rules system establish boundary conditions for proposed covers—when heating, the system implements a strategy as a set rule to keep the occupants comfortable and avoiding those temperatures considered "cool". Similarly when in cooling mode, the system implements a set rule for keeping occupants comfortable that can include avoiding those temperatures considered "warm."

For any fixed time, there is a boundary temperature above which all time-temperature pairs (or "elements") are in the set $\{W\}$ and below which all time-temperature pairs (or "elements") are considered to be in the set $\{C\}$. The boundary temperature for a given point in time is referred to as the thermal equilibrium boundary (TEB) for that point in time. The sequence of these boundary temperatures may be considered the thermal equilibrium boundary, denoted "TEB" or TEB(t) (or thermal equilibrium boundary sequence TEB(n) in the case of a discrete-time implementation) and represents a temperature at time t which is neither too cool nor too warm, i.e. a temperature that the system (e.g., an intelligent agent or an intelligent system) determines/estimates that the occupants will likely consider "comfortable." (i.e., neither too warm nor too cool) and thus would not be prompted to interact with the system. In other words, the TEB can be interpreted as the coolest temperature sequence the occupants would consider comfortable at a given time in the heating mode and the warmest temperature sequence the occupants would consider comfortable at a given time in the cooling mode.

In some instances, a sequence, boundary, line (or region) of separation between sets $\{W\}$ and $\{C\}$ may be referred to herein as the "thermal equilibrium boundary" (or "TEB"). Time-temperature datapoints disposed above the TEB have a set membership of $\{W\}$, and time-temperature datapoints disposed below the TEB have a set membership of $\{C\}$. Depending upon the number of comfort events involved in its generation, the "raw" comfort map may be highly complex, for example involving a large number of temperature transitions, close spacing in time between temperature transitions, etc. . . . . Although a control temperature sequence that closely follows the TEB line may be said to most accurately reflect the system's knowledge of an occupant's comfort, it may not, in some instances, be optimal for implementation in an HVAC system in the sense of representing the intent of the occupants with respect to maintaining occupant comfort while minimizing energy consumption. For example, implementing a highly complex comfort map (i.e., by setting control temperature sequence to track the TEB) may create excessive stress on components of the HVAC system, may not provide for sufficient "heating up" or "cooling down" times necessary for the mechanical and/or electrical health of the HVAC system, and/or may offer diminishing returns, the closer one gets to the TEB, with respect to energy efficiency. Moreover, "simpler" forms of the control temperature sequence (e.g., with fewer temperature transitions) may result in the same or similar levels of comfort for an occupant (as compared with the TEB itself) while preserving (or reducing the degradation of) the operational life of the HVAC system, and may better represent the true "intent" of the occupant. Methods described herein can be used to control an HVAC system for energy efficiency and occupant comfort based on historical occupant comfort feedback stored in the comfort map metric data. In some embodiments, the system is presented with (or obtains, generates, etc.) a comfort map defining a first TEB boundary, in a time-temperature parameter space, between (1) an upper temperature region having a respective first area defined by the first boundary, an upper limit, and an episode duration, and (2) a lower temperature region having a respective first area defined by the first boundary, a lower limit, and the episode duration.

The system then determines a plurality of sequential, constant-temperature segments (i.e., for any given point in time, there is only one corresponding temperature/segment), each having a non-zero duration and collectively define a second, discontinuous (in temperature) boundary in the time-temperature parameter space, wherein, in some embodiments: (1) an area between the second boundary and the upper limit is greater than the first area of the upper temperature region, when the HVAC system is in a cooling mode, or (2) an area between the second boundary and the lower limit is greater than the first area of the lower temperature region, when the HVAC system is in a heating mode. The system then operates according to a control temperature sequence that comprises or is based upon the determined sequence of constant-temperature segments.

According to some embodiments, with reference to the process flow of FIG. 1, the system first obtains, at 110, a comfort map (including a thermal equilibrium boundary, TEB, as discussed herein) from a profile library. The comfort map includes data derived from historical occupant feedback interactions and other types of comfort map metric data including element/set comfort characteristic data. At 130, the system identifies a plurality of possible sequences of "level" (i.e., single-temperature) time segments based on rules, for example relating to the TEB and/or an HVAC operating mode (e.g., heating mode or cooling mode). Sequences of segments following these rules are referred to herein as "covers." The system evaluates and compares covers of different cover forms (e.g., a single-segment cover, two-segments cover, n-segment cover, etc.). A preferred or "optimal" cover is selected, and used, at 150, as a basis to generate a control temperature time sequence/execution temperature trajectory.

Figure 2:
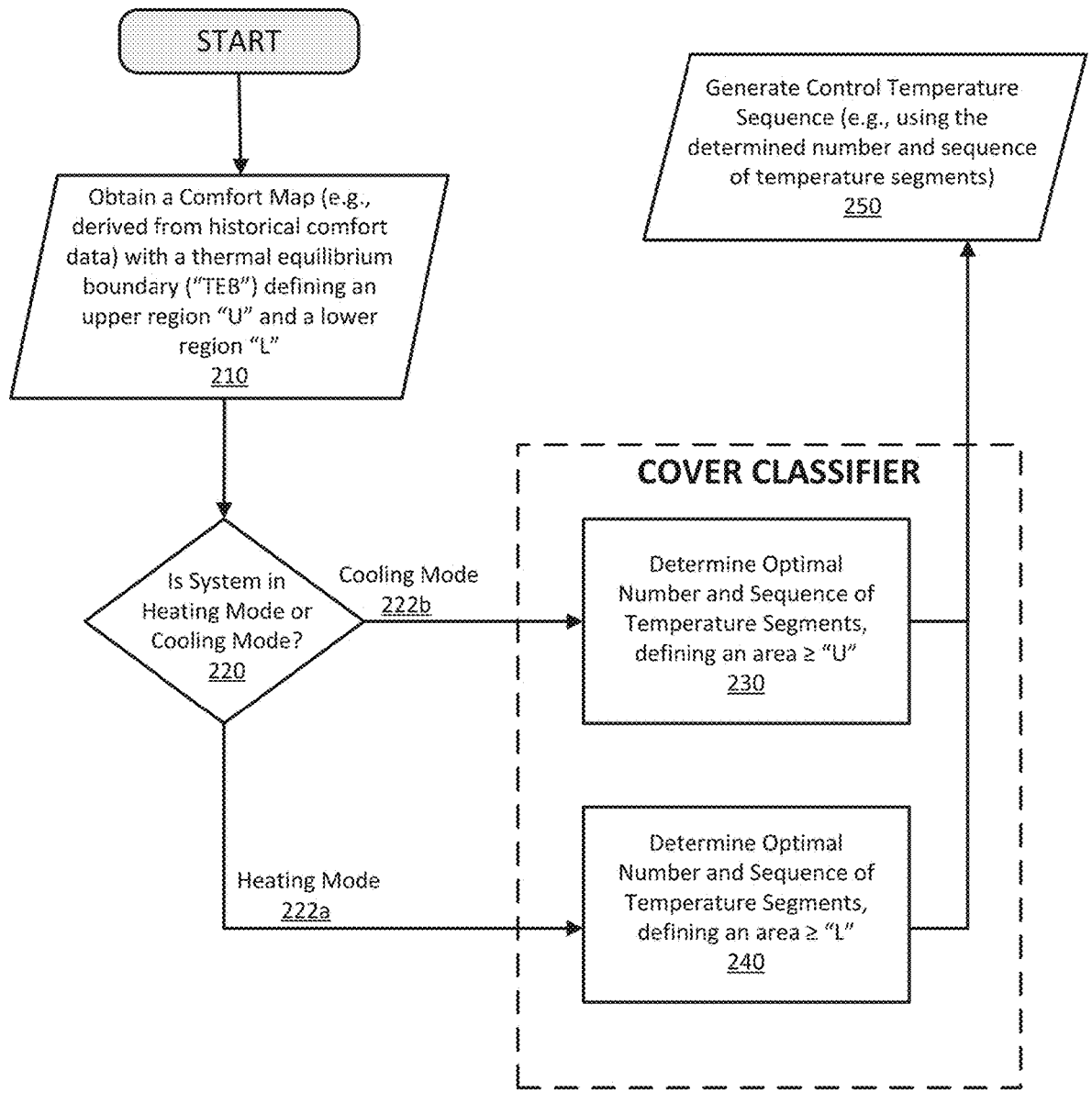
FIG. 2 is a flow diagram illustrating a process flow, including a determination of temperature segments, according to some embodiments.

The process flow of FIG. 2 illustrates an area-based determination of a modified temperature schedule, according to some embodiments. At 210, the system obtains a comfort map, for example as may have been derived from historical comfort event data, having a TEB boundary defining an upper region of elements or set of elements {W} with area "U" and a lower region of elements or set of elements {C} with area "L" within a time-temperature parameter space. At 220, the system proceeds according to its mode of operation. If the system is in a heating mode (222a), the process proceeds to 240, where an optimal number and sequence of temperature segments (again, a "cover") are determined in order to comply with comfort set rule requirements. If the segments comply with the comfort set rules, the area defined by the segments, within the time-temperature parameter space, is greater than or equal to the area "L." If the system is in a cooling mode (222b), the process proceeds to 230, where a number and sequence of temperature segments (or "cover") are determined in order to comply with comfort set rule requirements. If the segments comply with the comfort set rules, the area defined by the segments, within the time-temperature parameter space, is greater than or equal to the area "U." Steps 230 and 240 both result in the determination (or "selection") of a "cover" comprising one or more segments having a specified spatial distribution in the time-temperature parameter space, and the cover is then used, at 250, to generate a control temperature sequence. In some embodiments, the selected cover may be used directly, for purposes of setting the control temperature sequence. In other embodiments, the selected cover may be an input that is used in further computation or processing (e.g., a "comfort agent"), for example that takes into account one or more weather models, one or more thermal models (e.g., of the interior space being conditioned by the HVAC system), technical specifications of components of the HVAC equipment (e.g., sensors, temperature setpoint delays, etc.), and/or the like.

Figure 3:
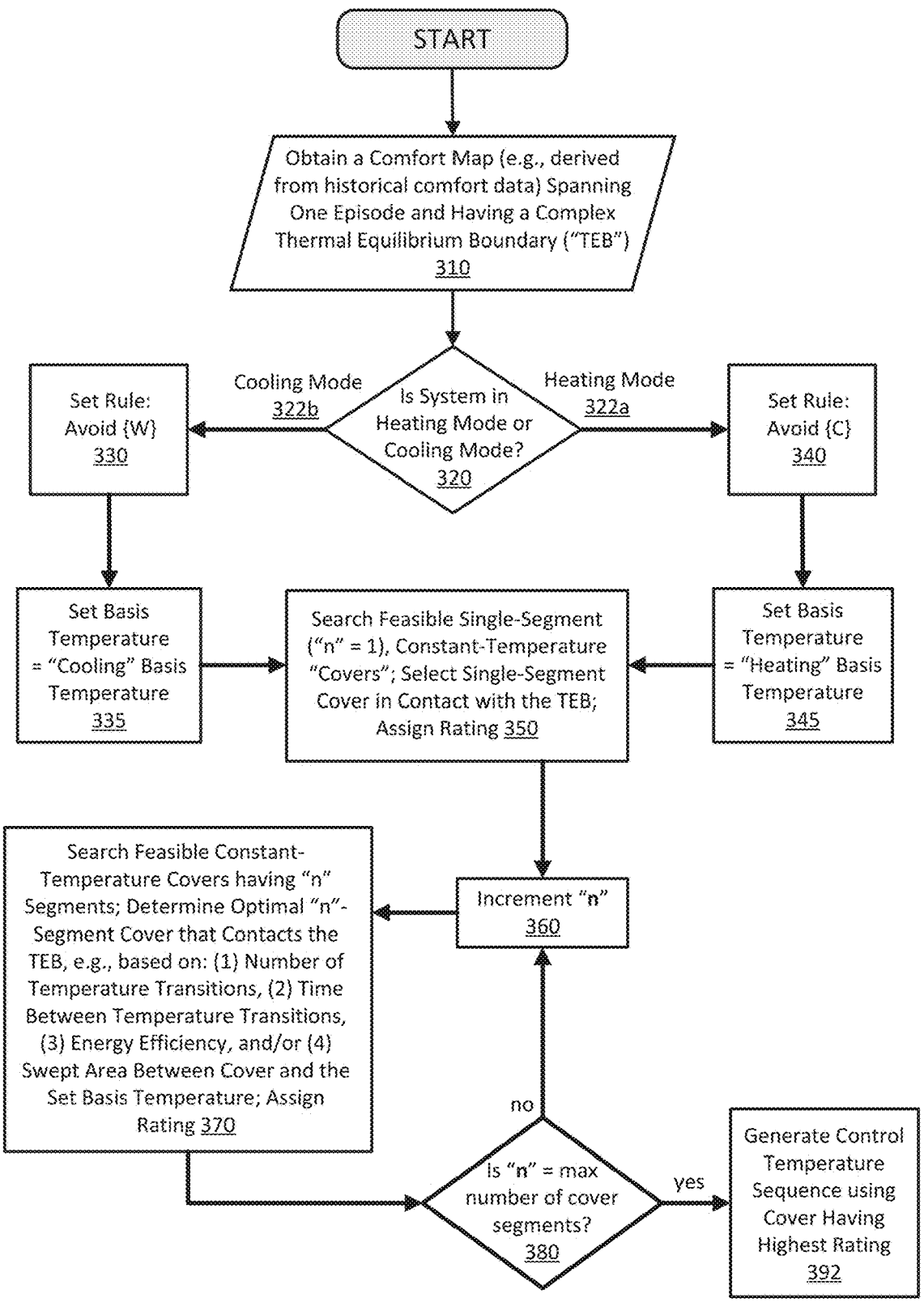
FIG. 3 is a flow diagram illustrating a process flow, including a computation of swept area, according to some embodiments.

Turning to the process flow of FIG. 3, a further process for determining a cover for use in setting or modifying a control temperature sequence, according to some embodiments, is shown. The system obtains, at 310, a comfort map or comfort map metric data (for example as derived from past occupant interactions with system, as discussed above) spanning an "episode" (e.g., a day, week, or subdivision thereof) and having a TEB boundary. At 320, the system proceeds according to whether the system is in a heating mode or a cooling mode. If the system is in a heating mode (322a), the system sets a rule, at 340, to "avoid" the cool set {C}. In other words, none of the to-be-determined segments will be permitted to take on values that fall within set {C}, i.e. less than the TEB, with the TEB itself defined to be in the set {W}. Also, at 345, the system sets a basis temperature to be equal to a "heating" basis temperature, which will serve as a reference for the swept area computation discussed below. If, instead, the system is in a cooling mode (322b), the system sets a rule, at 330, to "avoid" the warm set {W}. In other words, none of the to-be-determined segments will be permitted to take on values that fall within set {W}, i.e. temperatures greater than the TEB, with the TEB itself defined to be in the set {C}. Also, at 335, the system sets a basis temperature to be equal to a "cooling" basis temperature, which will serve as a reference for the swept area computation discussed below. The comfort set rules may be incorporated with the comfort map metric data and in some implementations include additional rules that define interaction with the comfort map data with sets and/or subsets {WO}, {WS}, {CO}, {CS}.

At 350, the system searches feasible single-segment, constant-temperature "covers" ("n"=1) for the comfort map, that comply with the rule set at 330 or 340. In some implementations, the proposed segment search process can be streamlined by requiring that each candidate or proposed segment contacts the TEB at at least one point. For "n"=1, the system then selects the best single-segment cover, assigning it a rating. The system increments "n" at 360 (so, on this first iteration, "n"=2), and proceeds to search, at 370, feasible constant-temperature two-segment covers for the comfort map (which, again, observe the relevant rule at either 330 or 340, depending on the path taken, and also requiring that all proposed segments contact the TEB at at least one point) to determine the best two-segment cover. In determining which two-segment cover is "optimal," a large number of factors (or any subset thereof) may be considered, including (but not limited to): the time between temperature transitions of a proposed cover, energy efficiency tradeoffs between candidate covers, and/or (relatedly) a comparison of respective swept areas between proposed covers and the set basis temperature of either 335 or 345. Element 370 may be considered the first stage of a dual stage proposed cover optimatization process:

a. where you choose the number of segments (n);
b. find the best fit cover for n segments; and
c. iterate n until a stopping case is reached, where the stopping case may be the maximum number of segments or a minimum savings threshold is not achieved by further iteration.

Initially, for illustrative purposes, the minimum swept area can be discussed as a key rating for the system to identify an optimal cover. However, other factors and weights may be used by the system to develop, propose, rate and identify an optimal cover and several of these factors are discussed in greater detail below.

As in 350, the system then assigns a rating to the optimal two-segment cover. At 380, the system checks whether "n" (in this case, "2") is equal to a maximum number of cover segments (i.e., to prevent an infinite loop), and if so, the system generates a control temperature sequence, at 392, based at least in part (as discussed above) upon the cover having the highest rating. The maximum number of cover segments (i.e., the maximum number of segments permissible in a single cover) can be set by the system as a commission parameter, hardcoded, or can be set by an occupant. In some embodiments, the maximum number of cover segments to be evaluated is 5. In other embodiments, the maximum number of cover segments to be evaluated is 7. In still other embodiments, the maximum number of cover segments to be evaluated is 9. If, at 380, the maximum number of cover segments has not been reached, the system proceeds to increment "n" again and repeats step 370 to identify an optimal three-segment cover for the comfort map. This loop continues until the maximum number of iterations is reached, and upon termination/exhaustion of the loop, the resulting optimal cover is used in the generation of the control temperature sequence. Although not shown in FIG. 3, in some embodiments the determination of an ideal cover does not proceed from n=1 through to n-maximum number of iterations. Rather, "n" is first assigned to a pre-defined maximum positive integer value and, once a corresponding optimal cover is determined for "n," "n" is then decremented, with each subsequent value of "n" being optimized in turn until "n"=0 (again, with the highest-rated cover being assigned to the control temperature sequence).

In some embodiments, machine learning can be applied to synthesize the sequence of "segments" of constant temperature from a comfort map, for example described in a form identical to that of Table 1, that closely approximates the actual intent of the occupants with respect to comfort while reducing energy or cost consumption in the process. This machine-learned entity is referred to herein as a "pseudo-schedule." The process of determining a pseudo-schedule will be developed via examples set forth herein. The process will then be formalized mathematically and an algorithm by which the "best" pseudo-schedule may be found is discussed herein.

Figure 4:
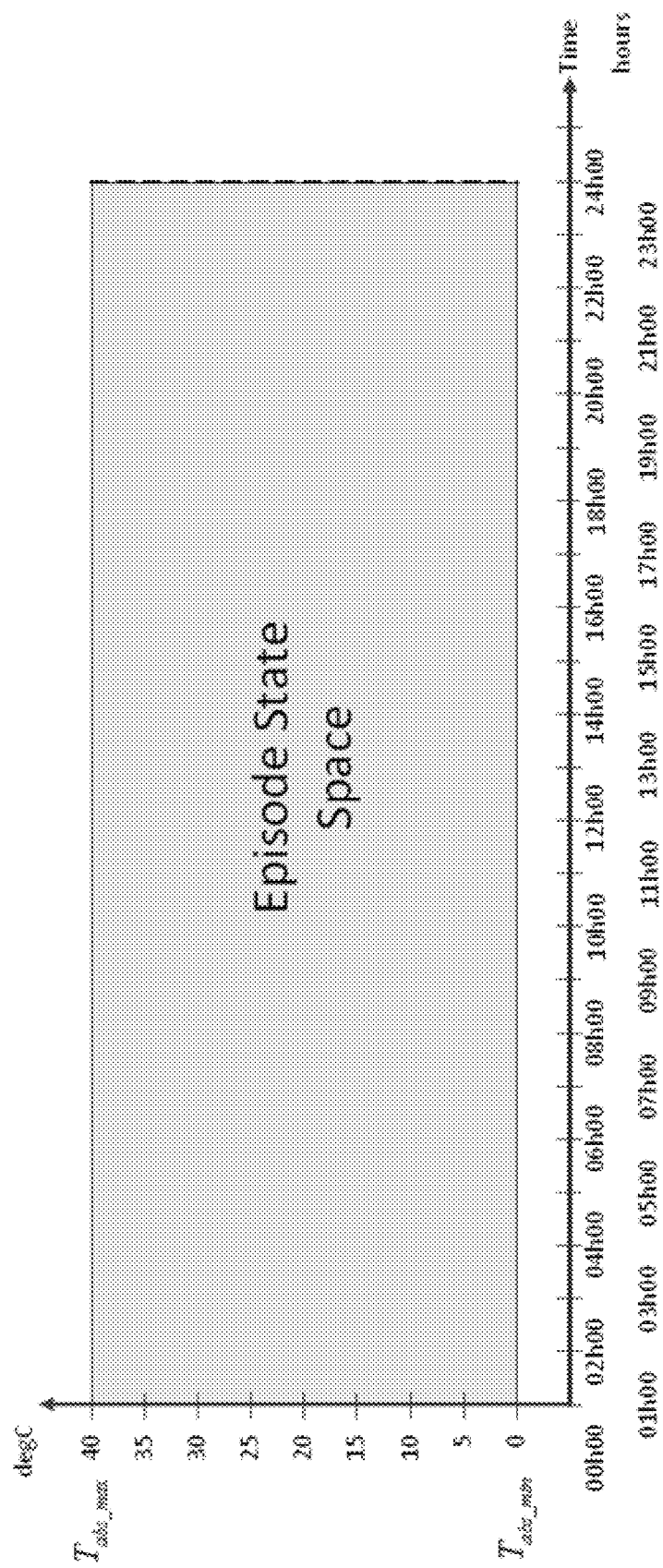
FIG. 4 shows an episode state space, according to some embodiments.

When utilizing comfort maps, and comfort map metric data it is helpful to discuss some of the comfort map operational parameters before discussing and describing the operation of a comfort control system implementing the cover balancing and ultimately determining a thermostat execution temperature trajectory. A comfort map "episode state space" is the permissible region of operation of the comfort control system over an episode in both time and temperature. FIG. 4 shows a graphical representation of an episode state space. The horizontal axis represents the time since the beginning of the episode, represented herein by the symbol t, and which spans a 24 hour left-closed interval in an implementation. This means the interval contains the defined start time of the present episode, say midnight, and includes everything up to, but NOT including the start time of the next episode. Episode time begins at 00h00, where in the representation xxhyy refers to a 24 hour clock time with xx representing the hour and yy representing the minute, and ending at 24h00. In the discussion that follows, time 00h00 represents midnight of the present day, whereas 24h00 represents midnight of the next day (which is not included in the episode state space). It is recognized that an episode need not begin and end at midnight. In these instances the time shown represents an offset from the actual start time. While the implementation described defines an episode as a 24 hour sequence, it is recognized that other periods may be used, such as "morning", "afternoon" and "evening".

In what follows, the symbol T is a variable responsive to dry bulb temperature. In what follows, dry bulb temperature is used and the word "temperature" refers to this, but it should be clear that any variable responsive to dry bulb temperature could be employed, including wet bulb temperature and other possible variants. Temperature is displayed along the vertical axis of FIG. 4. The representation of temperature is dependent upon the "mode" of the comfort control system (heating or cooling). For reasons which will become apparent, in the heating mode the episode state space range of T comprises a left-closed interval in temperature defined by $$T_{abs\_min} \leq T < T_{abs\_max} \quad (1.1)$$

where $T_{abs\_min}$ and $T_{abs\_max}$ are the minimum and maximum temperatures of interest to the system. In the cooling mode, the episode space temperature range comprises a right-closed interval defined by:

$$T_{abs\_min} < T \leq T_{abs\_max} \quad (1.2)$$

The numeric values of $T_{abs\_min}$ and $T_{abs\_max}$ are chosen based on practical considerations, such as the ability for electronic hardware to accurately measure temperatures over a given range, the practical operating range of a heating or cooling system, etc. In the episode state space of FIG. 4, $T_{abs\_min}$ and $T_{abs\_max}$ are shown as 0° C. and 40° C. respectively, and these values will be utilized in all examples presented.

In the present invention, the episode state space is "discretized" in both time and temperature, into rectangular "elements". In time, the 24 hours (1440 minutes) of the episode space is divided into N discrete time quanta of length $\Delta t_{res}$. In one implementation, $\Delta t_{res}$ is 10 minutes, which results in the episode space divided into N=144 discrete time "quanta", referred to herein by $t_q(n)$ where n is the index, in the range $0 \leq n \leq (N-1)$. One can reference the specific beginning time of the time quantum of interest in minutes, since the reference time 00h00 using:

$$t_n = n\Delta t_{res}, n=0,1,\ldots,N-1 \quad (1.3)$$

Using this definition, a concise definition of the nth time quantum, $t_q(n)$ is the left-closed interval defined by:

$$t_q(n) = \{t \in \mathbb{R} \mid t_n \leq t < t_{n+1}\} \quad (1.4)$$

As a shorthand notation, the index "n" may be used to indicate the time quantum and it will be understood that when time quantum "n" is used in this manner, it refers to equation (1.4).

In temperature, the episode state space quantization can be dictated for comfort preference classifier purposes by the "resolution" of the actual thermostat that controls the space temperature. This resolution is referred to herein as $\Delta T_{res}$. For convenience, $\Delta T_{res}$, $T_{abs\_min}$ and $T_{abs\_max}$ are chosen such that the length of the closed interval $[T_{abs\_min}, T_{abs\_max}]$ is an integer multiple of $\Delta T_{res}$. For example, in one implementation, the temperature set-point resolution of the thermostat is 0.5° C., which allows that the temperature range of the episode space, [0° C., 40° C.] can be represented by M=80 temperature quanta. In what follows, the index "m" will be used to represent this quantization, and the me time quantum will be written as either $T_H(m)$, or $T_C(m)$, dependent upon the mode (H implies heating while C implies cooling).

In the heating mode, temperature quanta are represented by left closed intervals in and heating temperature quantum $T_H(m)$ is given by:

$$T_H(m) = \{T \in \Re \mid T_m \leq T < T_{m+1}\}, m = 0, \ldots, M-1 \quad (1.5)$$

where $T_m$ is defined for either mode, using the index m as the quantum index, m=0, 1, . . . , M−1 by:

$$T_m = T_{abs\_min} + m\Delta T_{res} \quad (1.6)$$

In the cooling mode, temperature quanta are represented by right-closed intervals, and cooling temperature quantum $T_C(m)$, is given by:

$$T_C(m) = \{T \in \Re \mid T_m < T \leq T_{m+1}\}, m = 0, \ldots, M-1 \quad (1.7)$$

Again, one can refer to the quantum using the index "m", if the mode is understood, and doing so implies the temperature quantum defined by (1.5) or (1.7) as appropriate.

Using this quantization in time and temperature allows a composition of the episode state space into N×M rectangular "elements" as first noted above, referred to individually as $E_H(n,m)$ and $E_C(n,m)$, dependent upon the mode of operation of the system. These elements are defined by the regions:

$$E_H(n,m) = \{(t,T) \in \Re^2 \mid t_n \leq t < t_{n+1}, T_m \leq T < T_{m+1}\} \quad (1.8)$$

and $$E_C(n,m) = \{(t,T) \in \Re^2 \mid t_n \leq t < t_{n+1}, T_m < T \leq T_{m+1}\} \quad (1.9)$$

For n=0, 1, . . . N−1 and m=0, 1, . . . M−1.

Cover Classifier—

Figure 5:
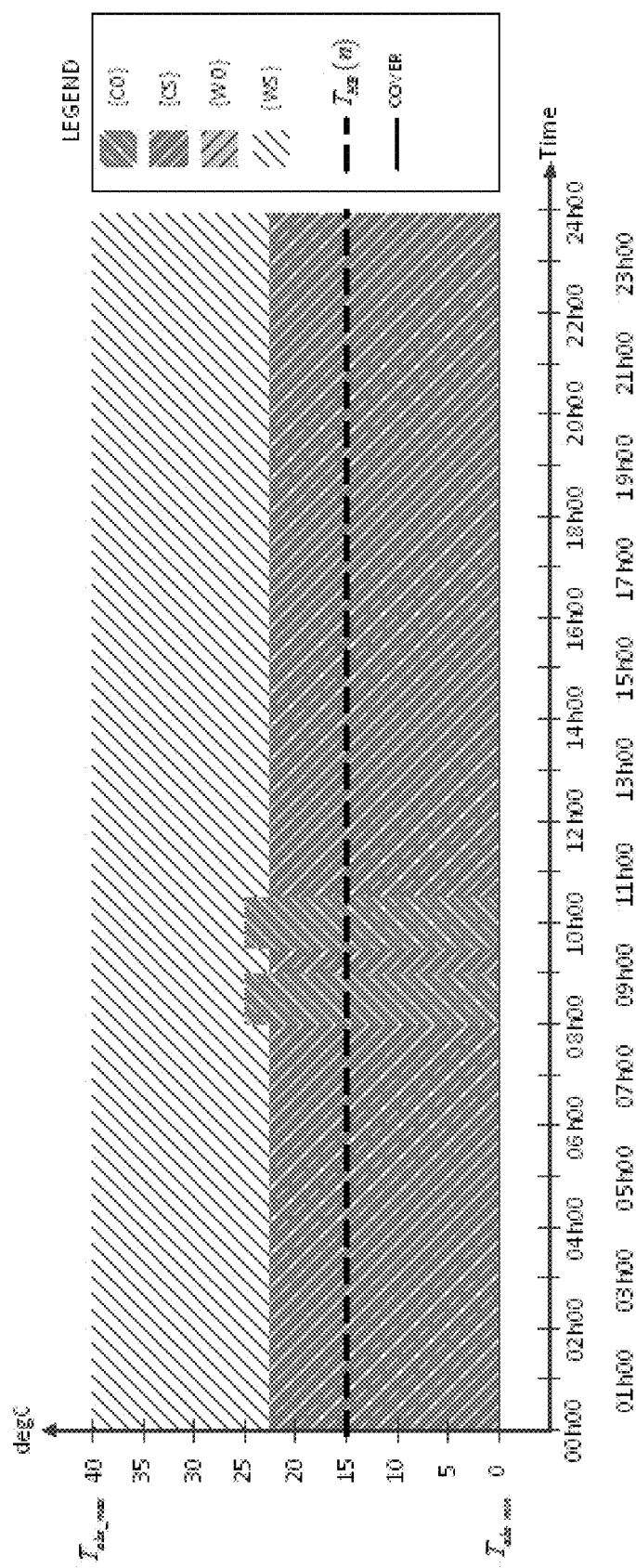
FIG. 5 is a exemplary comfort map, in heating mode, according to some embodiments.

FIG. 5 shows a simple example of a comfort map to which the notion of a pseudo-schedule temperature trajectory will be derived for execution by a thermostat control system (note that the same baseline comfort map is employed in FIGS. 5 through 11). It will be assumed in what follows that the comfort control system is in the heating mode. Operation in the cooling mode is the "dual" of that in the heating mode, and the details of using the method will be discussed subsequently. An initial assumption for operation in the heating mode is that the pseudo-schedule must "respect" the entire region of the comfort map assigned to the set {C}, i.e. the resulting pseudo-schedule should not contain any points or elements of the comfort map defined to be in the set {C} and/or its subsets e.g., {CO} {CS}, but can consider any points or elements assigned to the set {W} and/or its subsets e.g., {WO} {WS} as a candidate for inclusion in a pseudo-schedule. During heating mode operation, the system assumes that any operation in the region defined as {C} will be perceived as cool by occupants, and will likely trigger an action by the occupants in the form of a comfort event. In what follows, a time-temperature trajectory which respects the region {C} above is referred to as a heating "cover" that complies with comfort characteristic set rules. Because of the way the elements have been defined for both the heating and cooling mode, the TEB always respects the region of elements in set {C} in a heating operation/application and the region of elements in set {W} in a cooling operation/application. As stated previously, the TEB may be too complex to be operationally realizable in many cases. The purpose of the pseudo-schedule developed using the present invention is to determine a cover that may be less complex than the TEB may better represent what the occupants need for comfort, while also balancing energy efficiency/system achievability.

The particular class of heating covers of interest in the present invention is that which can be represented as K segments of constant temperature in the episode space with the characteristics including:

1. The range of each segment in the segmented cover is a left-closed interval.
2. K is a finite integer, K>0.
3. There is no overlap between the segments in time and each time in the episode is represented by exactly one of the segments.
4. Assigned to each segment of the cover is a single temperature
5. Each segment lies completely in the set {W} in compliance with the comfort characteristic set rules for the heating mode. This relates to the definition of an "element" in the heating mode, per equation (1.8) above. (In a similar manner, a cooling cover requires that the cover reside entirely in the set {C}, which relates to the definition of a cooling element per equation (1.9)).

A set of K segments meeting the criteria above is referred to as a K-segment heating cover.

FIG. 5 also shows a heating basis temperature sequence, $T_{HB}(n)$, of 15° C. which will be used subsequently to determine an appropriate pseudo-schedule. In one implementation of the system, $T_{HB}(n)$ is chosen as a constant minimum temperature the occupants will permit from the system in the heating mode and is usually to reflect practical considerations, such as keeping pipes from freezing and certain appliances operating properly, but also to ensure comfort of pets, etc. Other strategies for selecting a basis temperature sequence are possible, and will be discussed subsequently, but the present selection serves to demonstrate certain principles of the present invention.

From a visual examination of the comfort map of FIG. 5, it can be seen that there are a very large number of possible single segment heating covers which respect the elements of set {C}, comprising the union of the sets {CS} where {CS} represents system defined cool elements and {CO} represents occupant defined cool elements. Two such example proposed covers are shown in FIG. 6 that "respect" or comply with comfort characteristic set rules are Heating Cover A at 30° C. and Heating Cover B at 25° C.

Clearly, both heating covers respect the comfort preferences of the occupants, in that both lie within the range of elements in the set {W} and as such are candidates for a pseudo-schedule for a comfort control system operating in the heating mode. It is likely that the cover at 25° C. will use less energy than the cover at 30° C. as it is generally true that lower temperature setpoints use less energy than higher temperature setpoints when heating (and conversely when cooling). The best heating cover to use is that which saves the most energy, i.e. the minimum energy cover while still respecting the system set rule to avoid the {C} region.

Accordingly, a baseline metric which can be used to compare one heating cover against another to compute the potential for saving energy is the time-temperature area between the proposed heating cover and the basis temperature sequence $T_{HB}(n)$, referred to herein as the "swept area metric." There is a strong correlation between set-point temperature and energy usage as the so-called 6%/° C. rule which is directly reflected in the area. The U.S. Department of Energy estimates that when heating a conditioned space, energy savings of on the order of 1% per 8 hours can be achieved by reducing the temperature of the heated space by 1° F., or about 6% per ° C. per 24 hours (1440 minutes).

Figure 6:
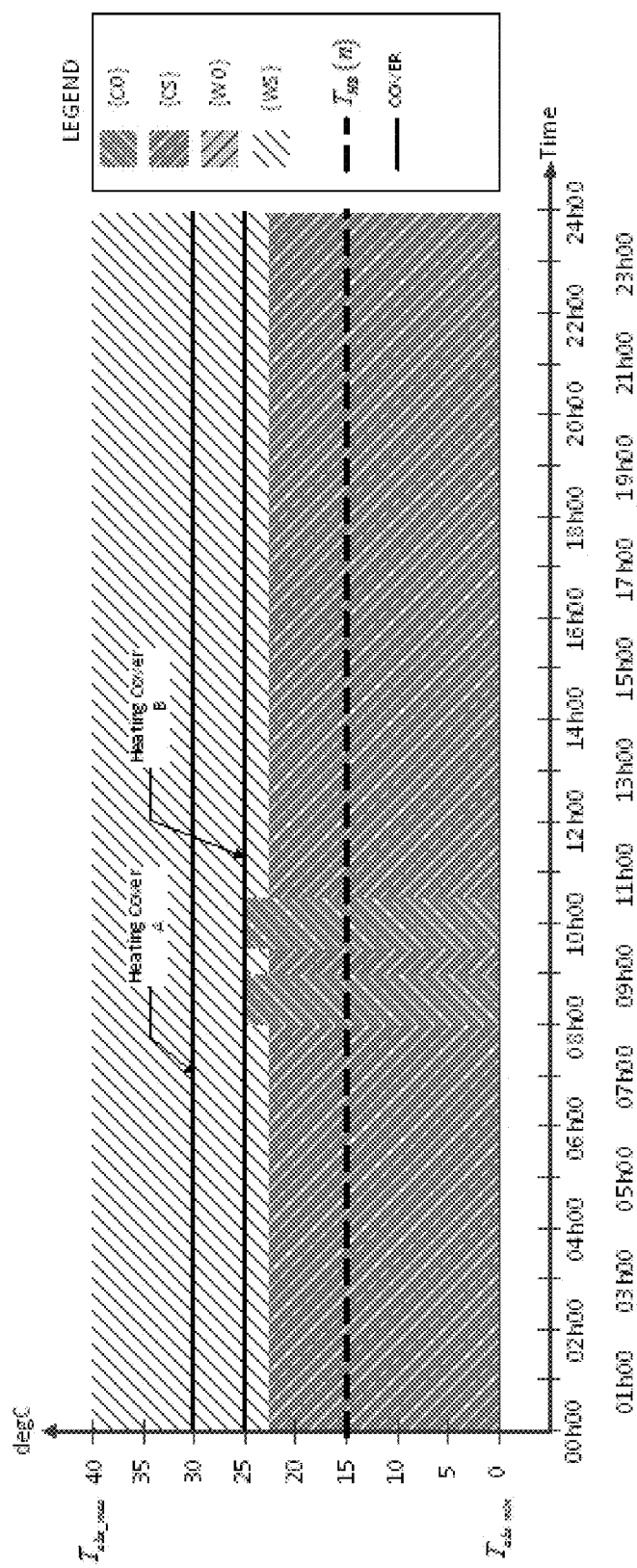
FIG. 6 is a chart (time versus temperature) of two, single-segment heating covers that respect all elements of set $\{C\}$, according to some embodiments.

For instance, in FIG. 6, the area swept by the 30° C. cover and $T_B(n)$ (heating cover "A" FIG. 6) is readily computed to be 21600° C.-minutes, whereas that swept by the 25° C. 1-segment heating cover (1-segment heating cover "B" in FIG. 5) is 14400° C.-minutes. Each C decrease in temperature contributes 1440° C.-minutes of swept area. The difference in area between the two heating covers is 7200° C.-minutes (which can readily be seen in FIG. 6), representing a change of 30%. Thus 1-segment heating cover "B" has the potential to save about 30% in energy contrasted with 1-segment heating cover "A".

Figures 7A, 7B:
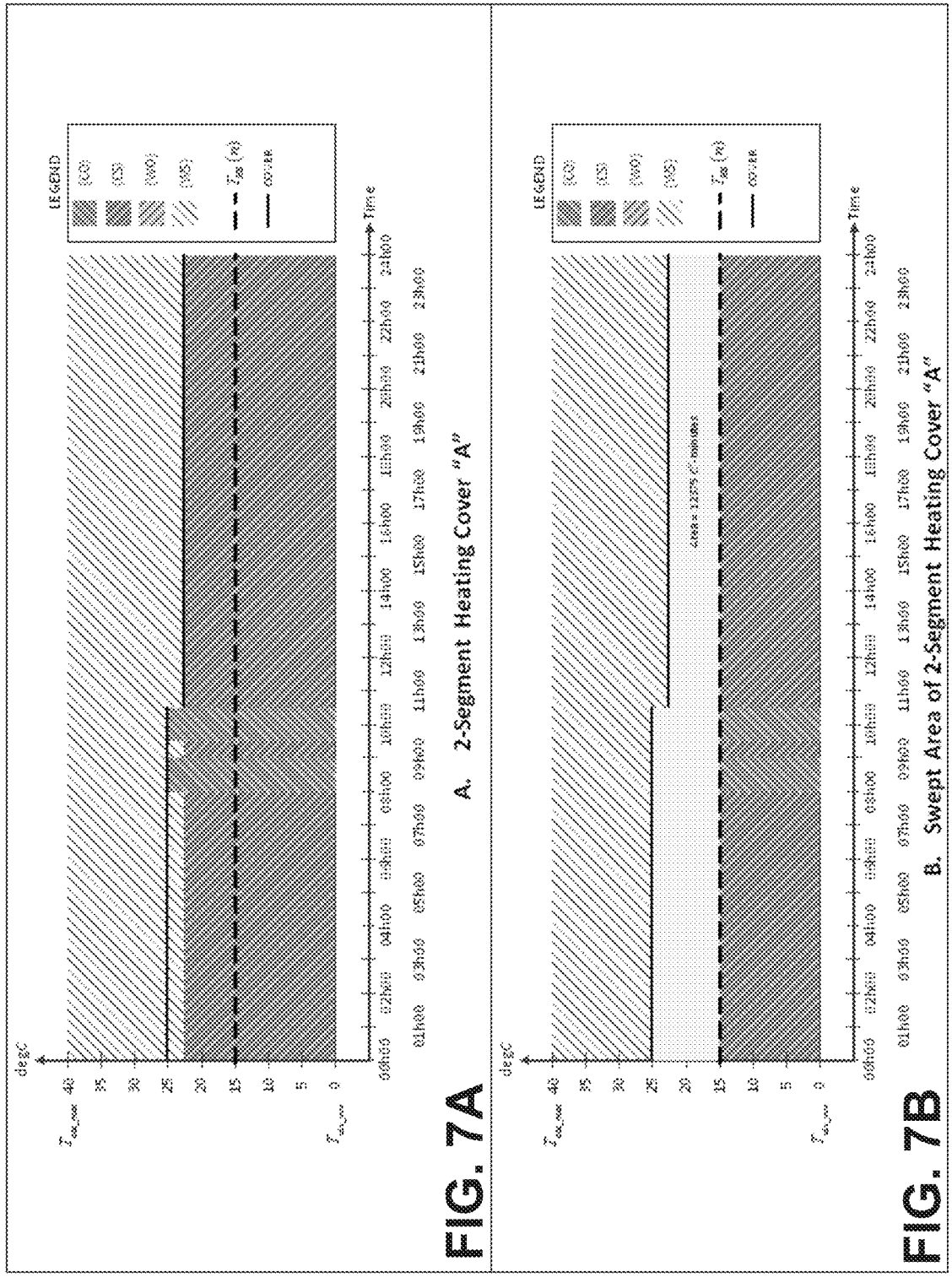
FIG. 7A shows a two-segment heating cover, according to some embodiments.
FIG. 7B shows a swept area of the two-segment heating cover of FIG. 7A.

This method of computing difference in area can also be used to compare more complex heating covers. FIGS. 7A, 7B and FIGS. 8A, 8B propose two 2-segment heating covers of the comfort map of FIG. 5. In FIGS. 7B and 5B, the computed swept area is shown (12375° C.-minutes and 13200° C.-minutes, respectively). Comparing FIGS. 7A, 7B and FIGS. 8A, 8B, it is intuitive visually that the heating cover of FIGS. 7A, 7B provides the better opportunity to save energy of the two, and this is also borne out in the swept areas.

The idea of a swept area metric can be implemented as a weighted metric—as a weighted swept area metric. Given a time quantum n, one can, for example, compute a weighted differential area for a given time quantum of the exemplary form:

$$\Delta A(n) = \sum_{m_b(n)}^{m_c(n)} f(m, m_b(n), n) A_e \quad (1.10)$$

where $A_e$ is the area of an element (i.e. $\Delta t_{res} \times \Delta T_{res}$ both described previously), $m_b(n)$ is the baseline temperature at time quantum n, $m_c(n)$ is the temperature quantum of the cover at time quantum n, $m_b(n)$ is the temperature quantum of the baseline temperature sequence at time quantum n and $f(m, m_b(n),n)$ is a (possibly non-linear) function comprising terms or factors (or both) of:

The time quantum, n, under consideration
The temperature quantum under consideration, m(n).

The total weighted swept area of the cover is the sum of the differential areas over all the time quanta comprising the episode in time:

$$A(\text{Cover}) = \sum_{n=0}^{N-1} \Delta A(n) \quad (1.11)$$

The function $f$ above may be chosen to make certain features of the covers dominant or recessive. For instance, the function f above may include a term or factor providing a polynomial weighting of the distance between the temperature of the cover and the baseline temperature or the inverse for each element, such as the square of the difference between the two or the inverse of the two. It may be advantageous to include a factor or a term providing a different weighting to time quanta dependent upon the cost of energy at time $t_n$, or the set membership at the thermal equilibrium boundary. An example of this is to provide a term or factor of one value if the thermal equilibrium boundary is bordered by an element established by an occupant action (a comfort event) and another if it is not. These may be computed prior to doing the cost calculation and the weighting applied to each element in the time quantum.

With this nomenclature, it can be seen that the unweighted swept area metric described above with regard to FIGS. 7A, 7B, 8A, and 8B is a special case of the weighted metric described in equations (1.10) and (1.11) with $$f(m,m_b(n),n)=1 \quad (1.12)$$

Figures 9A, 9B:
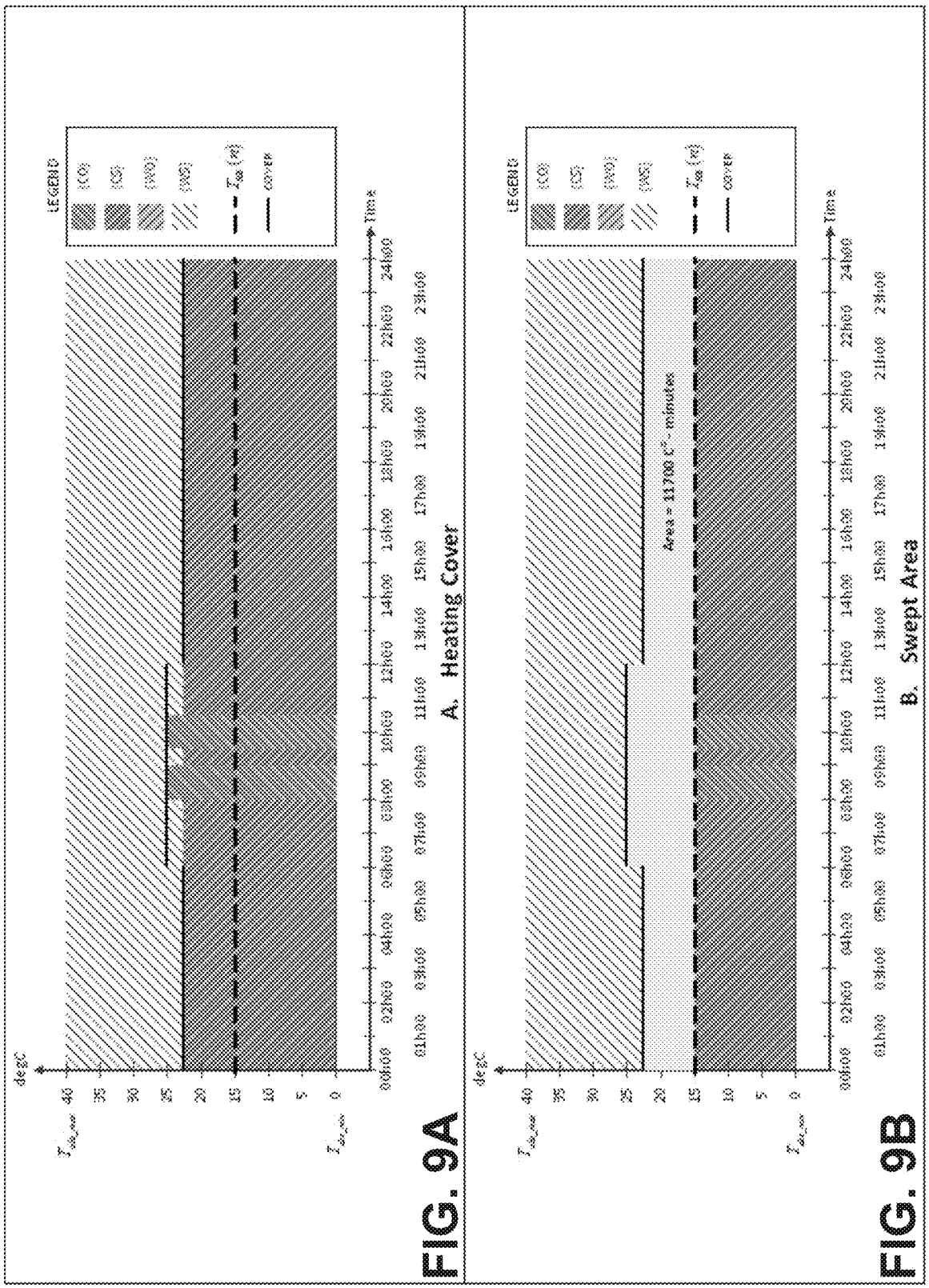
FIG. 9A shows a three-segment heating cover, according to some embodiments.
FIG. 9B shows a swept area of the three-segment heating cover of FIG. 9A.

One can propose representing the requirements of the comfort map of FIG. 5 using a 3-segment heating cover. FIGS. 9A, 9B and FIGS. 10A, 10B show two such heating covers. Both heating covers meet the requirement of respecting the set {C}, and both have lower swept area than any previous heating covers proposed. The swept area for FIGS. 9A, 9B is 11700° C.-minutes, and the swept area for FIGS. 10A, 10B is 11175° C.-minutes. The heating cover of FIGS. 10A, 10B has the property of having the minimum swept area of any heating cover comprising 3-segments illustrated in the figures. Furthermore, the heating cover of FIGS. 10A, 10B appears to be a good representation of what a schedule would likely "look like" if the occupants programmed it by hand.

Comparing the suitability of one pseudo-schedule with a fixed number of segments to another, it becomes readily apparent that, given a fixed, predefined number of segments to represent the occupant requirements for comfort while minimizing energy, of all the possible heating covers with "n" segments, the optimal cover is that which has the minimum swept area. However, minimization of the swept area is just one example of how proposed covers may be rated by the system to identify an optimal cover, for deriving an execution temperature trajectory.

It is possible to propose pseudo-schedules that are too complex to be practical. FIGS. 11A, 11B represent an extreme in pseudo-schedule complexity, comprising five segments/intervals which collectively exactly track the boundary between the sets {W}, comprising the union of sets {WS} and {WO} and {C} comprising the union of sets {CS} and {CO} in FIG. 5. This is a heating cover of optimal area (pseudo-schedule) for 5-segment heating covers—a swept area of 11100° C.-minutes. Comparing the areas swept by the three-segment and five-segment pseudo-schedule (FIGS. 10A, 10B and FIGS. 11A, 11B, respectively), it can be seen visually that the swept area of the five-segment pseudo-schedule is not significantly less than that of the three segment pseudo-schedule. The difference in swept area, 75° C.-minutes, represents the potential for 0.3% savings over the 3-segment heating cover. Furthermore, it is observed that the 5-segment pseudo-schedule is not likely to be representative of the actual occupant comfort requirements, especially over the segment spanning the time range (09h00,09h30). Furthermore, due to the actual system dynamics of a typical space (residence, room, etc.) it may be unlikely that the temperature would follow the trajectory of this segment with fidelity. Accordingly, the system may have a minimum savings threshold that is used to identify additional proposed cover complexity that does not result in significant energy savings. When covers with different n segment numbers are compared, the lower n is selected if the difference between swept areas is small. For example, depending on the implementation, small may be considered 10% reduction in swept area per unit increase in the number of segments for the rated proposed cover. In other implementations, the threshold may be a 8% reduction in swept area in the number of segments or a 12% reduction in swept area. Alternately, the threshold may be a specific reduction in the swept area degree-minutes, for example 200° C.-minutes.

Heuristically, it is observed that when the difference between the swept-area metric of two pseudo-schedules of different complexity is small, the less complex pseudo-schedule generally better represents the intent of the occupants for comfort than that of higher complexity. A method to codify this concept will be provided subsequently, when an automated algorithm to select an appropriate pseudo-schedule is presented.

The cover concept described above is readily extended to the cooling mode. In a manner completely analogous to the heating application, a K-segment cooling cover is defined to have the following properties:
1. The range of each segment in the segmented cover is a left-closed interval.
2. K is a finite integer, K>0.
3. There is no overlap between the segments in time and each time in the episode is represented by exactly one of the segments.
4. Assigned to each segment in the cover is a single temperature
5. Each segment lies completely in the set {C} in compliance with the comfort characteristic set rules for the cooling mode.

This is identical to the definition of a K-segment heating cover except that each of the segments lie in the set {C} instead of the set {W}.

In the heating mode, a basis temperature sequence $T_{HB}(n)$ was defined as the basis for computing the swept area of a heating cover. In the cooling mode, an analogous basis temperature sequence $T_{CB}(n)$ is defined from which swept area in the cooling application is computed. One choice for the sequence $T_{CB}(n)$ useful for demonstration purposes is a constant maximum temperature expected by the occupants under worst case conditions. One choice for the sequence $T_{HB}(n)$ useful for demonstration purposes is a constant minimum temperature expected by the occupants under worst case conditions.

Figure 12:
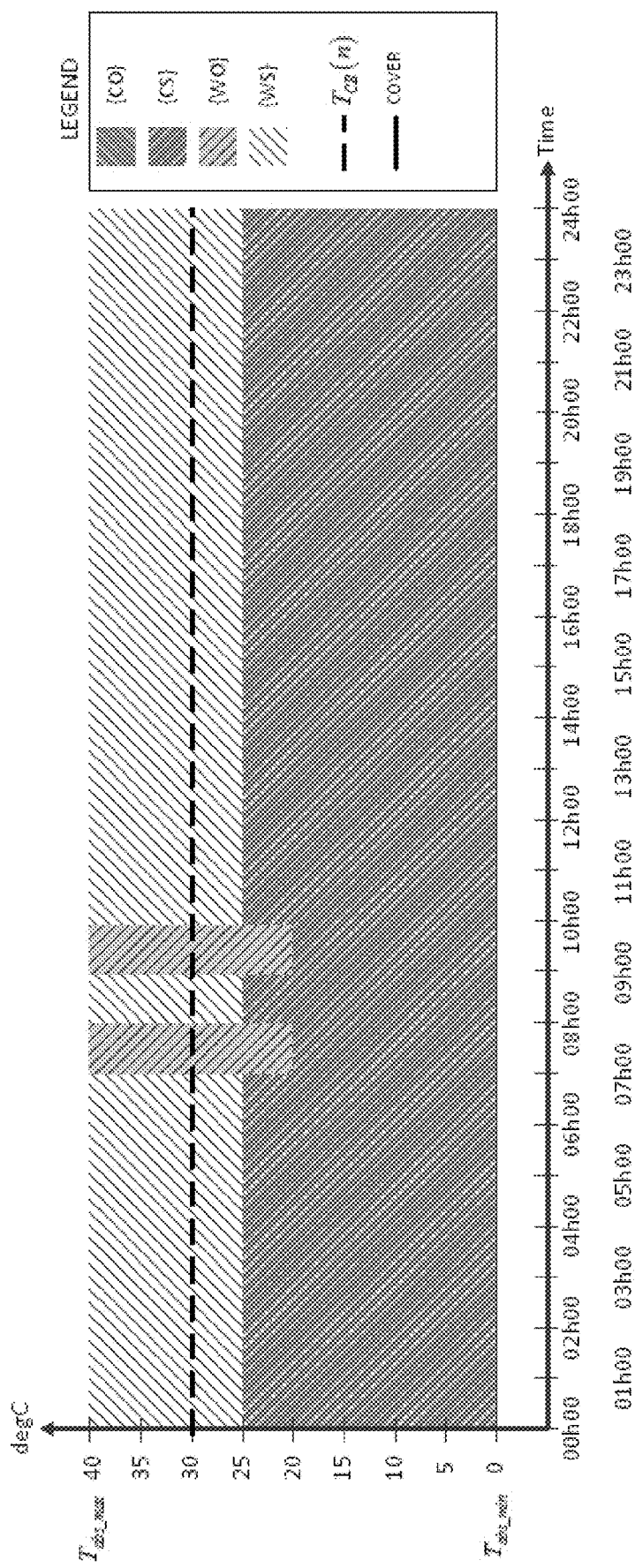
FIG. 12 is a chart (time versus temperature) of a comfort map in "cooling mode," according to some embodiments.
Figure 13:
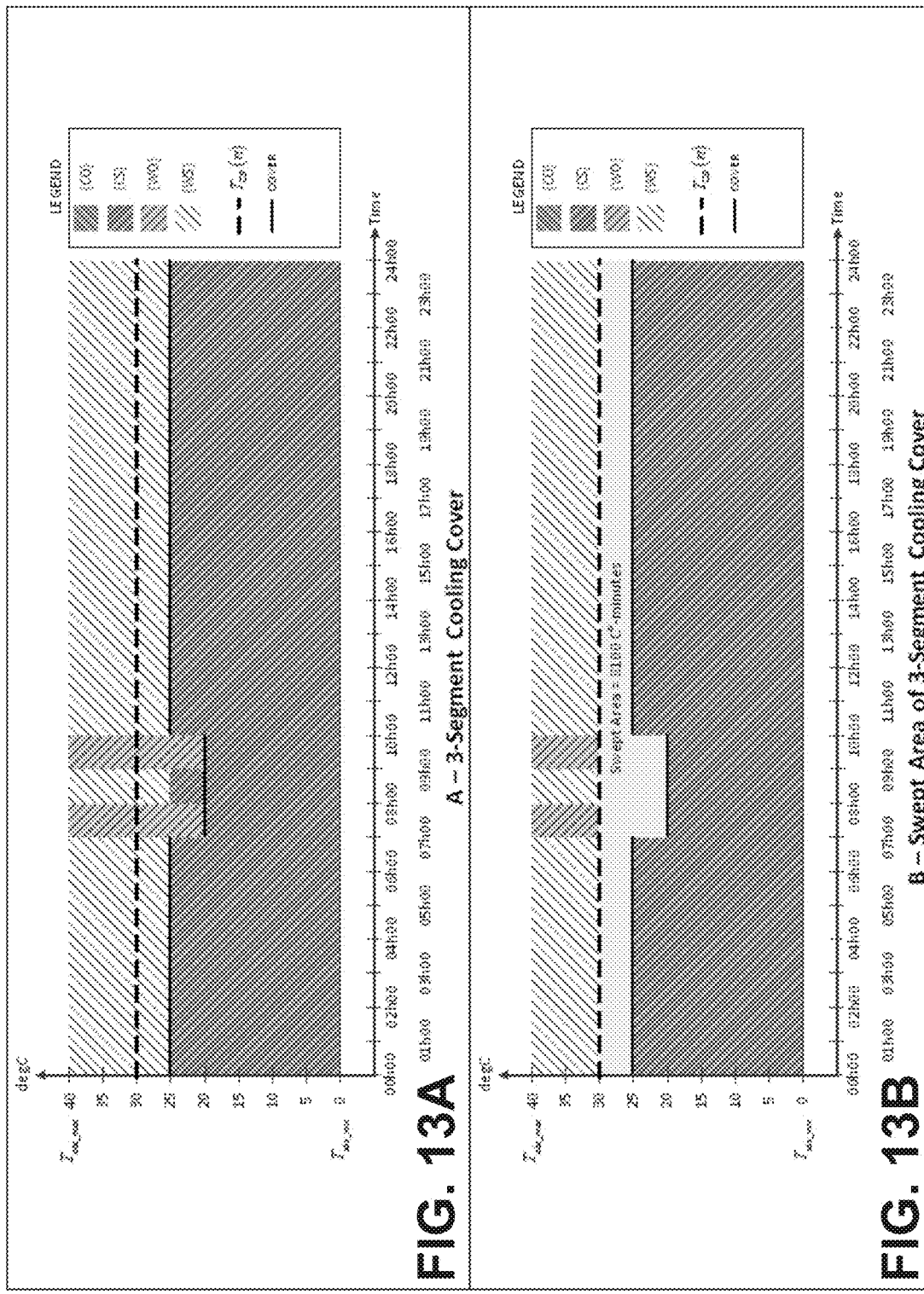
FIG. 13A shows a three-segment cooling cover for the comfort map of FIG. 12.
FIG. 13B shows a swept area of the three-segment heating cover of FIG. 13A, according to some embodiments.

FIG. 12 shows a cooling mode comfort map with a $T_{CB}(n)$ of 30° C. and two "minus" comfort events, and FIGS. 13A and 13B show a corresponding 3-segment cooling cover with a swept area of 8100° C.-minutes.

Note that employing the quantization defined by Equations (1.7) and (1.9) in the cooling mode permits the cover to reside on the border between the sets {W} and {C}, while the cover itself lies completely in the set {C}, as desired.

Cover Classifier—Formalization:

Optimal Cover (Pseudo-schedule)—A more concise definition of an optimal cover (heating or cooling) of K segments is now provided. Consider a time-partitioning of the episode into K intervals by defining a specific sequence of K−1 non-decreasing time values $\{t_1 \ldots t_{K-1}\}$ called "cut points," with the property:

$$00h00 \leq t_k \leq t_{k+1} < 24h00, k=1, \ldots, K-1 \quad (1.13)$$

If one augments this sequence with the time values:

$$t_0 = 00h00 \quad (1.14)$$

and $$t_K = 24h00 \quad (1.15)$$

then the time spanned by the augmented sequence, referred to as $\{t_k\}_K$ "spans" the entire episode space, partitioning it into K intervals, each of length $\Delta t_k$ given by:

$$\Delta t_k = t_{k+1} - t_k, k=0, \ldots, K-1 \quad (1.16)$$

Note that $t_1$ is permitted to take the value 00h00, which implies that the first interval could have length 0. This is done for completeness to facilitate comfort events initiated exactly at the beginning of an episode. Geometrically, the intervals of constant temperature comprising a pseudo-schedule may be represented by a sequence of K segment "objects", written $\{s_k\}_K$, k=0, ..., K−1 based on the partition of intervals on which it is based. Each object defined by:

A start time, $t_{start}(k)=t_k$, k=0, ..., K−1, in the range (00h00,24h00)

An end time, $t_{end}(k)=t_{k+1}$, k=1, ..., K−1 in the range (00h00,24h00),

A single temperature value $T_k$, defined over the entire segment.

Concisely, each segment object $s_k$ can be written:

$$s_k = \{(t,T)|T = T_k, t_k \leq t < t_{k+1}\}, k=0,1, \ldots K-1 \quad (1.17)$$

An additional requirement on the sequence of segments $(s_k)_K$ is that it be a heating or cooling cover of the comfort map it is intended to model, dependent upon the operating mode of the system. Topologically, for a heating application, each of the segments of the cover must reside entirely in the set {W}. Recall from above that the thermal equilibrium boundary TEB(t) was defined as the boundary between the set {W} and {C} at time t. For the sequence $(s_k)_K$ to be a cover of the comfort map and hence a possible pseudo-schedule the temperature $T_H(k)$ corresponding to segment $s_k$ must satisfy:

$$T_H(k) \geq \sup_{t_{start}(k) \leq t < t_{end}(k)} \{TEB(t)\} \quad (1.18)$$

in the case of a heating cover and $$T_C(k) \leq \inf_{t_{start}(k) \leq t < t_{end}(k)} \{TEB(t)\} \quad (1.19)$$

in the case of a cooling cover.

Except for the case of a heating cover in which the entire episode state space is assigned to the set {C} or a cooling cover in which the entire episode state space is assigned to the set {W}, (both trivial cases), for any given time sequence $\{t_k\}_K$, an infinite number of "covers" of length K can be constructed, since any value of $T_H(k)$ satisfying 1.18 or $T_C(k)$ satisfying 1.19 may be chosen. A cover of particular interest, unique to the sequence $\{t_k\}_K$ is that for which equality holds in 1.18 or 1.19 dependent upon the operating mode of the system. A cover having this property also has the property of minimum area between $T_{HB}(n)$ or $T_{CB}(n)$ respectively and the segment, and if each segment area is minimized, it is readily shown that the total area of the cover is minimized. We refer to the property of a cover constructed with this property of minimum area for a specific set of K−1 cut points resulting in the sequence $\{t_k\}_K$ as $O_a\{t_k\}_K$, and the unique cover with this property as $C^*\{t_k\}_K$.

A cover of length K which has the property that the swept area of the cover is less than or equal to that of any other cover of K segments is said to have the property $O_a^*(K)$, and note that a cover with this property may not be unique. It can be seen visually that the three segment pseudo-schedule of FIGS. 10A, 10B has the property $O_a^*(3)$, as one cannot compute a pseudo-schedule with three segments sweeping less area, no matter what time-partition is used. Similarly, the cooling cover shown in FIGS. 13A, 13B has the property $O_a^*(3)$.

In quantized episode space, the thermal equilibrium boundary described above as TEB(t) can be described in terms of a time sequence, TEB(n)

$$TEB_H(n) = \min_{m=0,\ldots,M-1} \{T(m) \mid E_H(n, m) \in \{W\}\} \quad (1.20)$$

For operation in the heating mode and $$TEB_C(n) = \min_{m=0,\ldots,M-1} \{T(m) \mid E_C(n, m) \in \{C\}\} \quad (1.21)$$

When quantized space is utilized, the are a generally large, but finite number of covers possible.

Cover Classifier—Algorithms

Two algorithms are presented herein, from which a pseudo-schedule, approximately optimal in both comfort and energy savings may be derived:

An algorithm to find a cover of K-elements satisfying the property $O_a^*(K)$, defined above An algorithm to determine the "best" cover to use as the pseudo-schedule.

These algorithms are described in greater detail below.

An Algorithm to Find a Heating Cover of K Elements Satisfying $O_a^*(K)$—

Given the quantized nature of the comfort map, the number of unique sequences comprising K elements is large but finite if only the quantized time values are used. An exhaustive search could be conducted to find a sequence of length K having the property $O_a^*(K)$, and there are other searching methods, such as a depth-first search, breadth-first search or other searching methods that are well established in the literature. An approximation employed herein is to ignore the quantization for the moment and employ a search algorithm such as a "random walk" or "simulated annealing" method, varying the cut point subsequence of the sequence $\{t_k\}_K$ to find a sequence closely approximating $O_a^*(K)$ in a finite number of iterations. Restricting the search to covers having the property $O_a^*\{t_k\}$ is extremely helpful, and for a given partition sequence, is readily computed. It is to be understood that the optimal cover, is going to be the optimal cover of the proposed cover(s) included in the search.

Figure 14:
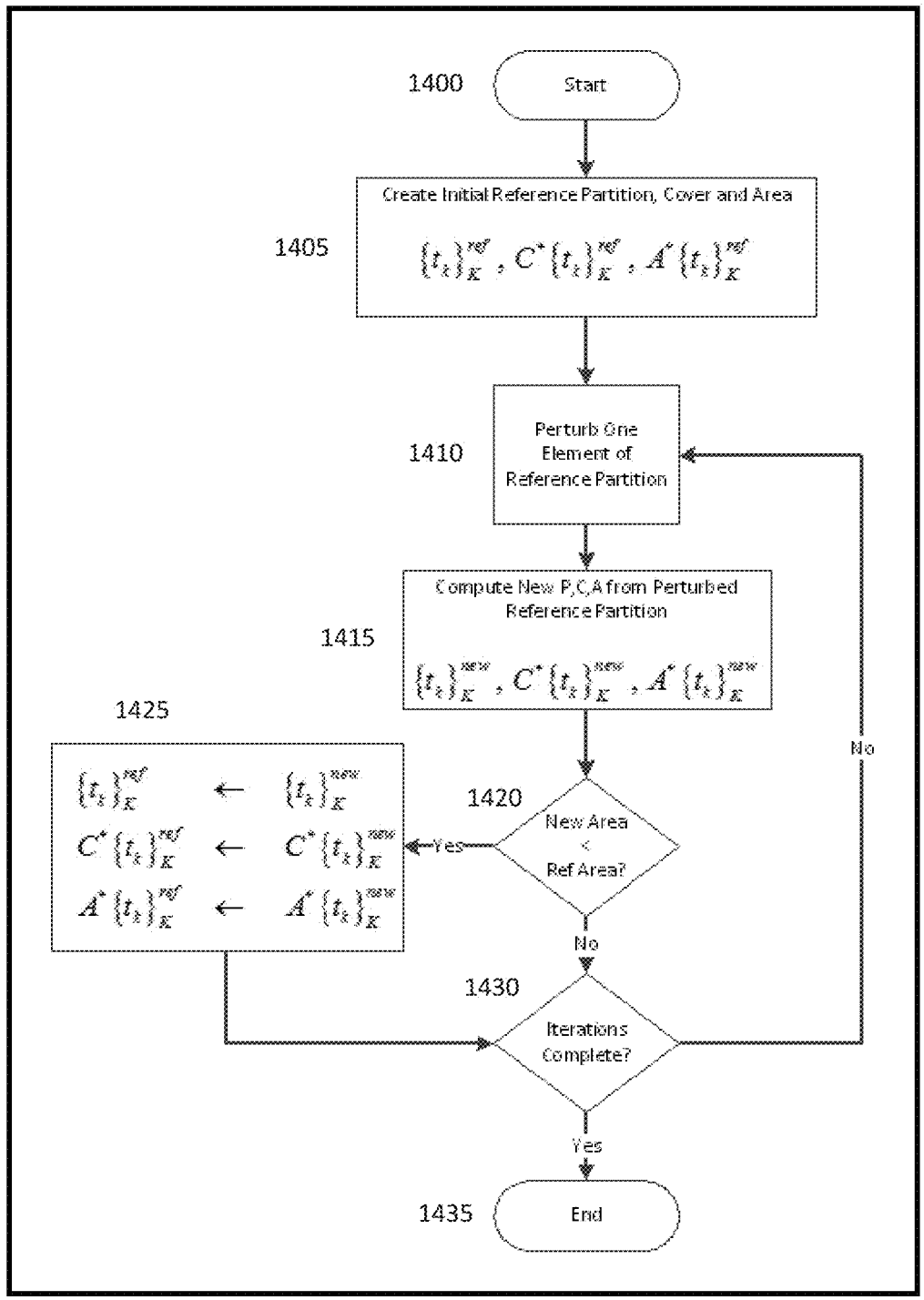
FIG. 14 is a flowchart of a random walk method for determining a pseudo-schedule, according to some embodiments.

FIG. 14 is a flowchart of an exemplary method of determining a pseudo-schedule comprising K segments which approximates one with property $O_a^*(K)$ utilizing a random walk search technique. Referring to FIG. 14, upon entry at 1400, the first process step 1405 is to determine an initial set of cut points, reference time partition, cover of minimum area and swept area to be used as a reference to begin the random walk search process. This triple is denoted [$\{t_k\}_K^{ref}$, $C^*\{t_k\}_K^{ref}$, $A^*\{t_k\}_K^{ref}$] in FIG. 14, with details on a method to determine $C^*\{t_k\}_K^{ref}$ to follow subsequently. Determining the time partition $\{t_k\}_K^{ref}$ of K+1 non-decreasing time values comprises the steps:

1. Create a cut point sub-sequence of K−1 unique random numbers, quantized per above and in the range [00h00, 24h00]
2. Augment the sequence with two more elements having the values 00h00 and 24h00 naming them $t_0$ and $t_K$ respectively
3. Sort the resulting sequence in the order of increasing time values.

Once the reference time partition is determined, the corresponding cover of K segments with minimum area, $C^*\{t_k\}_K^{ref}$ for the sequence can be determined. Having determined $C^*\{t_k\}_K^{ref}$, the swept area between this cover and the appropriate base temperature sequence ($T_{HB}(n)$ or $T_{CB}(n)$ dependent upon the system mode), denoted $A^*\{t_k\}_K^{ref}$ is readily determined using conventional mathematical integration in the case of a continuous time episode space, or a summation of elements in the discrete time case.

Having initialized the reference sequence, reference cover and reference area, the method then iterates to look for a "better" cover (based on the swept area metric) by perturbing one of the members of the reference cut-point subsequence. An iteration counter (not shown) for this purpose is established to keep track of the number of iterations already performed, with 100,000 iterations typical. The iteration loop begins at process step 1410, in which one of the K−1 time elements of the cut point subsequence described above is chosen at random and the time value for that element is replaced by a random value in the range (00h00,24h00), such that the K−1 random numbers remain unique. The cut point subsequence is readily identified from the sorted, full sequence $\{t_k\}_k^{ref}$ as those elements $t_1, \ldots t_{K-1}$. In process step 1415, the resulting partition, $\{t_k\}_K^{new}$, resulting cover $C^*\{t_k\}_K^{new}$, and swept area $A^*\{t_k\}_K^{new}$ are computed in a manner identical to that described in process step 1405.

Having computed the new time partition, cover and area above, the area of the new partition is compared against that of the reference partition in decision block 1420. If the area of the new time partition is less than that of the reference time partition, then it represents a "better" partition than the reference and the reference partition is replaced by the new one in process step 1425. If the area of the new time partition is not less than that of the new partition, then it is simply discarded. In either case, flow passes to decision block 1430 where a test is made to determine if the specified number of iterations has been completed. If not, flow is passed back to process step 1410, where a new iteration begins per above. If the requisite number of iterations is complete, the method terminates 1435, with the resulting reference partition, cover and area the desired estimate of the pseudo-schedule best representing the comfort map with K segments.

A method to determine a cover $C^*\{t_k\}_K$ meeting the objective $O_a^*\{t_k\}_K$, i.e. the cover of minimum swept area for a specific time partition, and the corresponding area $A^*\{t_k\}_K$, required in steps 1405 and 1415 in the flowchart of FIG. 14 is now presented. The method is based on the premise that minimizing the area swept by each segment of a cover individually also minimizes the total area swept by the cover.

Recall for each time quantum n in the quantized episode state space, there is a corresponding minimum temperature in the comfort map representing the boundary between the sets $\{C\}$ and $\{W\}$. Consider the $k_{th}$ segment object $s_k$ defined by the specific time partition $\{t_k\}_K$ according to (1.17). Define the start and ending indices $n_s(k)$ and $n_e(k)$ for the $k_{th}$ segment by:

$$n_s(k) = \min\{n | n\Delta t_{res} > t_k\} \quad (1.22)$$

and $$n_e(k) = \max\{n | n\Delta t_{res} \leq t_{k+1}\} \quad (1.23)$$

For this particular $k_{th}$ segment to be part of a cover, $T_k$ must satisfy the following:

$$T_k \geq \max_{n=n_s(k),\ldots n_e(k)} (TEB_H(n)) \quad (1.24)$$

In the case of heating mode operation and $$T_k \leq \min_{n=n_s(k),\ldots n_e(k)} (TEB_C(n)) \quad (1.25)$$

in the case of cooling mode operation.

With respect to the base temperature sequence in the heating mode, $T_{HB}(n)$, the area swept by the $k_{th}$ segment, $A_k$, is $$A_k = \Delta t_{res} \sum_{n=n_s(k)}^{n_e(k)-1} [T_k - T_{HB}(n)] \quad (1.26)$$

and $$A_k = \Delta t_{res} \sum_{n=n_s(k)}^{n_e(k)-1} [T_{CB}(n) - T_k] \quad (1.27)$$

in cooling mode.

It is straightforward to see that the value of $T_k$ which minimizes (1.26) is that for which equality applies in (1.24) or (1.25) respective of the mode. Accordingly, a method to determine the temperatures, $T_k$, $k=0, \ldots, K=1$ resulting in the unique cover $C^*\{t_k\}_K$ of the comfort map for the specific partition set $\{t_k\}_K$, is:
1. Determine $n_s(k)$ using equation (1.22) above
2. Determine $n_e(k)$ using equation (1.23) above
3. Using $n_s(k)$ and $n_e(k)$, determine $T_k$ from the equality condition of the appropriate equation (1.24) or (1.25) above Knowing the details of the cover $C^*\{t_k\}_K$, the area corresponding area $A^*\{t_k\}_K$ is readily computed using $$A^*\{t_k\}_K = \sum_{k=0}^{K-1} A_k \quad (1.28)$$

where the $A_k$ are computed using the mode appropriate version of (1.26) or (1.27) above.

A Method for Selecting the "Best" Heating Cover as the Pseudo-Schedule—

As discussed above, there is a tradeoff between an excessive simplicity of a pseudo-schedule in which comfort requirements are satisfied with limited potential to save energy, and excessive complexity in which the pseudo-schedule follows the contours of the comfort map closely, or even perfectly but probably does not represent the actual intentions of the occupants with respect to comfort. It was also seen from the examples that there appears to be a point of diminishing energy return as the number of segments of cover with property $O_a^*(K)$ increases as defined by the swept area metric.

Using the examples presented above as a guide, in one implementation an algorithm for determining a pseudo-schedule of length K comprises the following steps:
1. Compute a heating cover $C^*(1)$ with property $O_a^*(1)$ and compute the swept area of that cover, $A^*(1)$
2. Iterate per the following:
   a. Given the previous heating cover of K segments, $C^*(K)$ with property $O_a^*(K)$ and swept area $A^*(K)$, compute a heating cover of K+1 segments with property $O_a^*(K+1)$ and the corresponding swept area $A^*(K+1)$.
   b. Compare the area $A^*(K+1)$ with $A^*(K)$. If $A^*(K+1)$ is not significantly less than $A^*(K)$, STOP and declare the pseudo-schedule to be the heating cover with K segments as the best choice.
   c. If $A^*(K+1)$ is significantly less than $A^*(K)$ in step b above, continue to iterate until:
      i. The criterion of step b above is satisfied
      ii. A pre-defined maximum number of segments, $K_{max}$ has been reached. In this case, STOP and use the heating cover of $K_{max}$ segments. Recall from the discussion above that $K_{max}$ is typically on the order of 5-9 segments.

In one implementation, significantly less is determined by computing the ratio of swept area of a heating cover $C^*(K+1)$ to that of swept by one with heating cover $C^*(K)$, and comparing this to a constant, $0 < \beta \leq 1$. If the ratio is less than $\beta$, i.e.

$$\frac{A^*(K+1)}{A^*(K)} < \beta \quad (1.29)$$

Or, alternatively $$A^*(K+1) < \beta A'(K) \quad (1.30)$$

then the more complex heating cover has the potential to save significant energy and should be considered over that of lesser complexity.

In some embodiments, it can make sense to skip iterations in step 2 above or rather that it makes sense to not consider steps in the iteration. For instance, if there is at least one plus comfort event window represented in the comfort map extending the set $\{C\}$, then heating covers comprising 2 or 4 segments can probably be ignored—there should be "better" heating covers with 3 or 5 segments. If one extends (1.30) to the case K+2, one finds $$A^*(K+2) < \beta A^*(K+1) < \beta A^*(K) \quad (1.31)$$

From which one may write:

$$A^*(K+2) < \beta^2 A^*(K) \quad (1.32)$$

as a necessary condition to prefer the heating cover with K+2 segments over one with K segments. More generally, when comparing two heating covers of $K_1$ and $K_2$ segments respectively with $K_2 > K_1$ having properties $O_a(K_2)$ and $O_a(K_1)$, a necessary condition to choose the heating cover having $K_2$ segments is $$A^*(K_2) < \beta^{(K_2-K_1)} A^*(K_1) \quad (1.33)$$

If an objective is to speed up computation by ignoring heating covers with, for instance, even numbers of segments, one can arbitrarily make a case to accept 1.24 as a sufficient condition for acceptance of a more complex heating cover over one less complex.

It has been determined experimentally that when the area of a five-segment heating cover is less than about 80% of a three segment heating cover, the five segment heating cover heuristically does a better job of representing the correct tradeoff between energy and comfort. Accordingly, from Equation (1.33), an appropriate value of β is on the order of 0.9. If, during the execution of the above algorithm, a cover is found with the same swept area as the TEB, this cover is automatically the best cover to use, as there can be no cover with less swept area Interactive "Schedule" Optimization—

Having established the background above, a method of interactive comfort control is described in the next series of figures. As discussed previously, some of the drawbacks of programmable schedules described above are:

1. Someone or something must establish the initial schedule for each episodic sequence by means of "programming", which has been shown to be a complicated and distasteful task for the typical consumer.
2. The process of programming begins with the programmer making a guess as to the comfort requirements for the occupants of a space. If the guess does not adequately represent requirements for comfort, the programmed schedules must be modified.
3. A programmed schedule does not readily allow for changing schedules by the occupants. Each time the comfort requirements of the occupants change, the schedule must be re-programmed. This is again a distasteful process for the typical consumer.
4. Schedules must be programmed by specifying temperature values and it is tacitly assumed that the occupants know how to relate temperature to comfort. This promotes a conservative approach to programming, where the occupants may learn to specify temperatures. For instance, in a heating application, the occupants may specify 23° C. as a suggested temperature considered "comfortable" by all, not knowing if 22.5° C. would be considered equally comfortable.
5. While modifying temperatures to improve comfort can be a conditioned response, modifying temperatures to save energy is not, as the reward latency is too high. There is accordingly minimal motivation to modify schedules to save energy and only the most energy conscious consumers will "experiment" with schedules for this purpose.

In the embodiment described in this section, the occupants do not need to program schedules, and the system itself takes on the role of experimentation with the objective to save energy. Except for some minor initial commissioning, all interaction by the occupants with the system can be limited to conditioned responses to establish comfortable temperatures when the space is actively occupied.

The invention makes use of one or more comfort maps, in which each quantum element of the episode space is declared to be in one of two sets, namely "warm" {W} or "cold" {C} as described above. Since it is expected that both the occupants and the system will interact with a comfort map, it is helpful to describe the set {C} as the union of two mutually exclusive sets. One set comprising the set {C} is the set of elements which have been declared cold by the occupants by means of plus comfort events. This set will be denoted the set {CO}. The other set comprising the set {C} are those elements declared cold by the system. This set will be denoted the set {CS}. In a completely analogous manner, the set {W} is represented by the union of two mutually exclusive sets, {WO}, which comprises those elements of the comfort map declared warm by the occupants (via minus comfort events) and {WS}, comprising those elements of the comfort map declared warm by the system.

As disclosed above, the elements of a comfort map are assigned membership in one of two sets:

A set {W}, indicating that the specified temperature at the specified time is considered subjectively "warm"

A set {C}, indicating that the specified temperature at the specified time is considered subjectively "cool".

And, for each time quantum, there is a thermal equilibrium boundary above which all elements are assigned to the set {W} and below which all elements are assigned to the set {C}. When heating, the elements of the boundary are assigned to the set {W}, and when cooling, the elements of the boundary are assigned to the set {C}. The thermal equilibrium boundary can be used as one control temperature sequence meeting the requirement that an admissible control temperature sequence avoid time-temperature values for which the corresponding element is assigned to the set {W} when cooling and the set {C} when heating. A time-temperature sequence meeting this requirement is referred to herein as a "cover" of the set to be avoided.

The present disclosure defines a method to compute a particular form of control temperature sequence over an episode given a comfort map meeting the above requirement, namely a control temperature sequence comprising a fixed number of segments in time of constant temperature, called a K-segment cover, where K is the number of segments. A K-segment cover intended for the heating comfort mode is referred to as a K-segment heating cover and has the following characteristics:

1. The range in time for each segment in the K-segment cover is a left-closed interval. It includes the time of the start of an interval and all times up to but not including the start of the next interval. This assures that a specific time occurs in only one interval.
2. K is a finite integer, K>0.
3. Each time quantum of the state space of the episode is represented by exactly one of the segments.
4. Assigned to each segment of the cover is a single temperature
5. Each segment lies completely in the set {W}.

A K-segment cooling cover has identical characteristics to K-segment heating cover except each segment of the cover must lie completely in the set {C}. The method finds a special version of K-segment cover, called an optimal K-segment cover, which is a cover comprising K segments that minimizes a swept area metric, defined as the area on a comfort map between a control temperature sequence and a chosen baseline temperature sequence.

Figure 15:
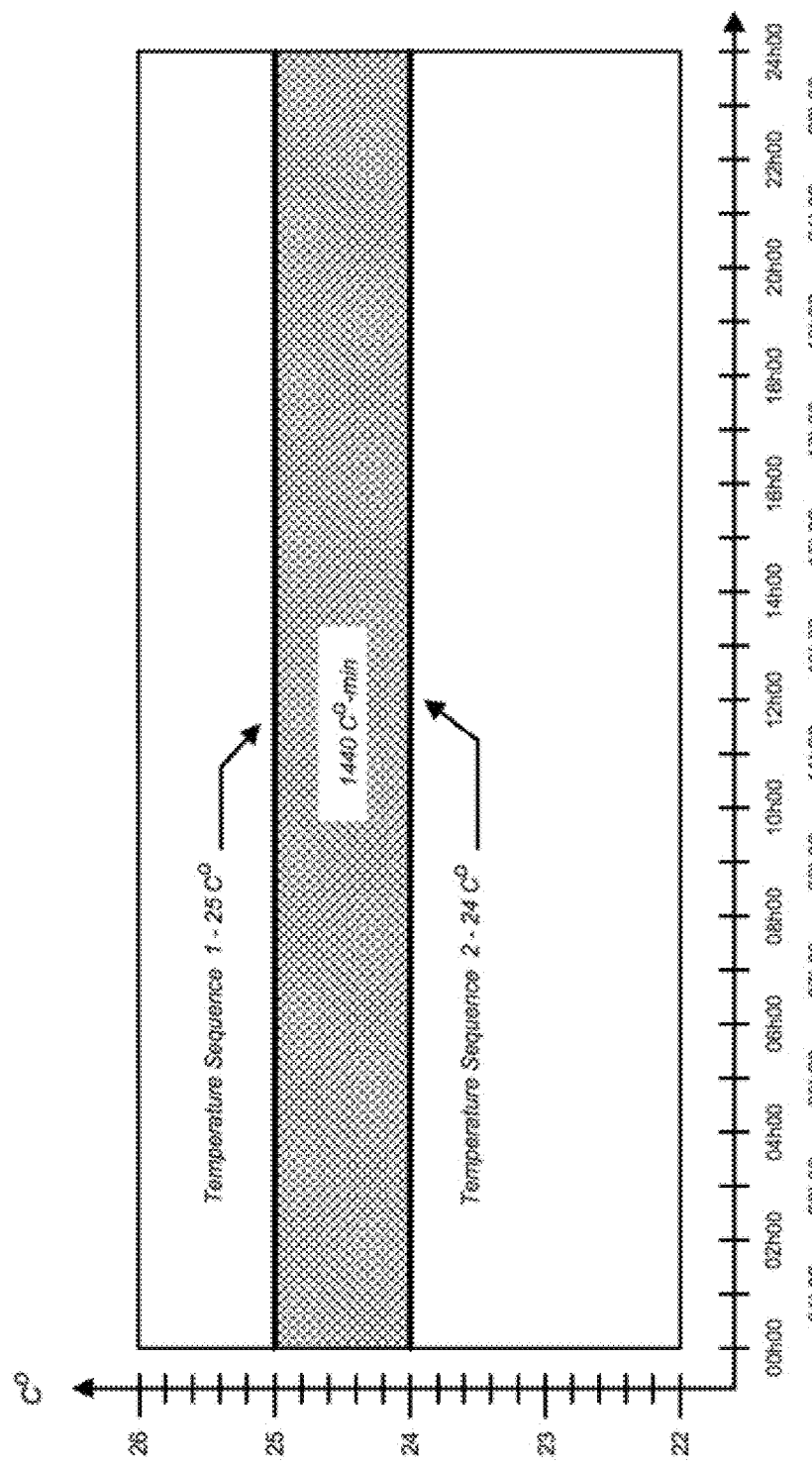
FIG. 15 is a chart (time versus temperature) illustrating the "swept area metric," according to some embodiments.

As discussed above, the U.S. Department of Energy estimates that when heating a conditioned space, energy savings of on the order of 1% per 8 hours can be achieved by reducing the temperature of the heated space by 1° F., or about 6% per ° C. per 24 hours (1440 minutes). This notion of a degree of reduced temperature over a period of time can be represented as an area (referred to herein as a "swept area") on a comfort map. FIG. 15 shows this graphically. In FIG. 15, two control temperature sequences are shown; one at a constant 25° C. and another at 24°. The swept area between the two temperature sequences is 1440° C.-min and according to the above, this area represents about 6% savings by reducing the heating temperature 1° C. over the entire period, or about 0.004%/deg C.-min.

One can also view this difference in area as the difference between two swept areas computed relative to a baseline temperature. The swept area between a control temperature sequence and a baseline temperature is a swept area metric, which can be used as a heuristic to compare the relative energy saving potential of different control temperature sequences. Suppose in FIG. 15, one computes the swept area between the 25° C. sequence and a constant baseline temperature sequence, say 22° C. It is readily calculated that the swept area between the 25° C. sequence and the baseline is 4320° C.-minutes. Similarly, the swept area of the 24° C. sequence and the baseline is 2880° C. The difference between the two swept areas is 1440° C., which is the difference shown shaded in FIG. 15, and represents a 6% savings in energy according to the U.S. Department of Energy.

Figure 16:
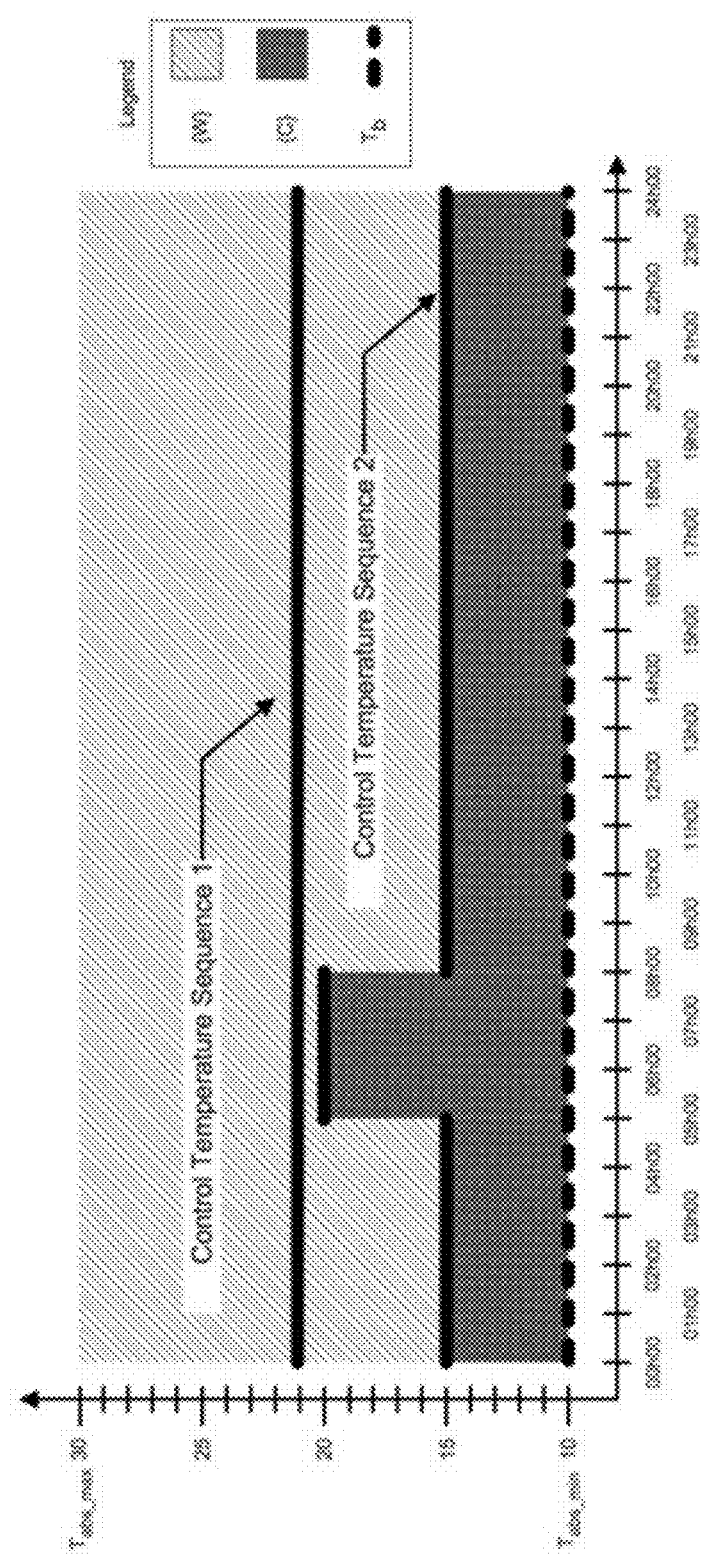
FIG. 16 shows a comfort map showing two control temperature sequences, according to some embodiments.

Consider the comfort map of FIG. 16 for use in a heating comfort application, and two potential control temperature sequences labeled Control Temperature Sequence 1 and Control Temperature Sequence 2.

Figure 17:
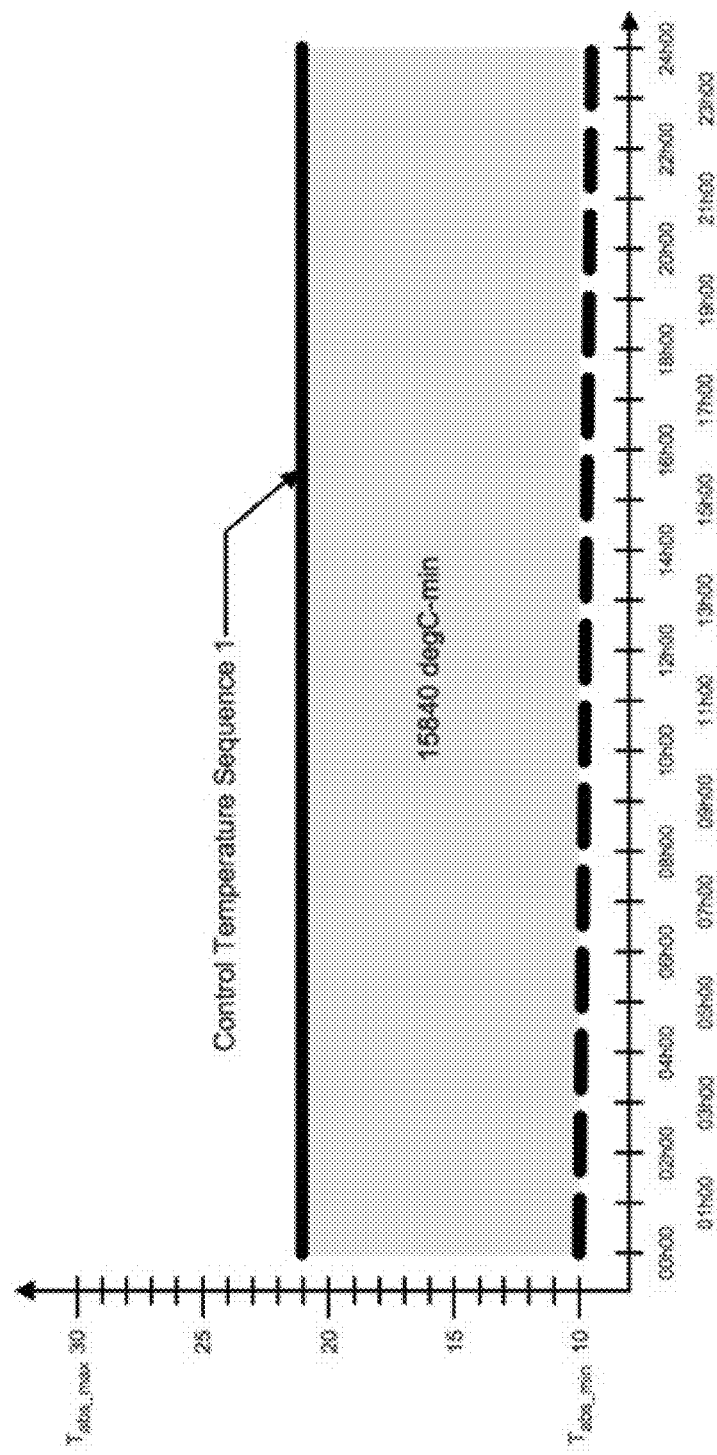
FIG. 17 shows a swept area for control temperature sequence 1 of FIG. 18.
Figure 18:
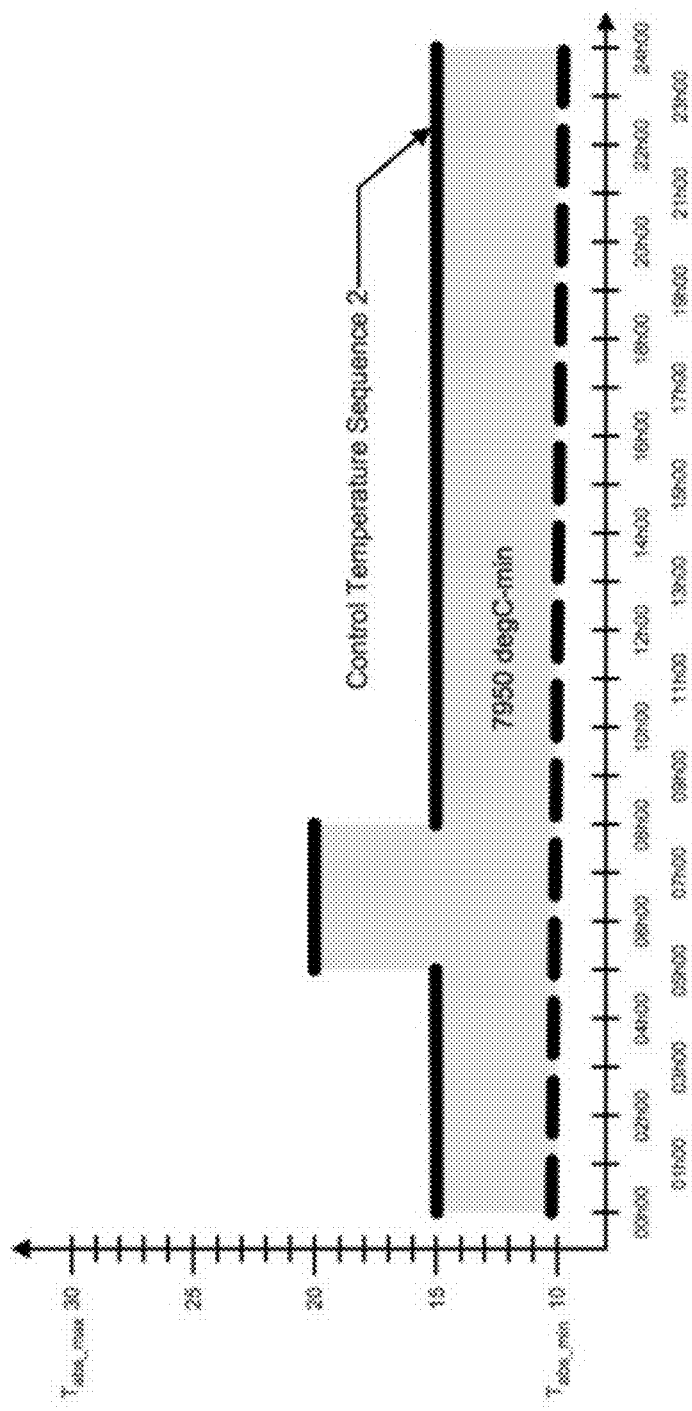
FIG. 18 shows a swept area for control temperature sequence 2 of FIG. 18.

Using the swept area metric and the baseline temperature of 10° C. one can compute the swept areas of the two sequences and compare them. FIG. 17 shows graphically the swept area of control temperature sequence 1 to be 15840 deg C.-min, while FIG. 18 shows the swept area of control temperature sequence 2 to be 7950 deg C.-min. The difference between the swept areas of these two control temperature sequences is 7890 deg C.-min. Multiplying this area by the 0.004%/deg C.-min as described above, control temperature sequence 2 should provide energy saving on the order of 31% over control temperature sequence 1.

The constant 0.004%/deg C.-min heuristic is but a crude approximation to the actual energy that might be saved, which depends upon many things, including the weather, but using swept area as a metric to determine potential to save energy when comparing one control temperature sequence against another is a simple approximation that can be used by a computer algorithm to quickly compute the relative energy saving potential of one cover vs another. All other considerations notwithstanding a cover with less swept area should use less energy over the course of an episode than one with greater swept energy. An optimal K-segment heating cover is formally defined as a heating cover of K-segments having swept area less than or equal to any other K-segment heating cover for a given comfort map. An identical cover for cooling can be defined, referred to as an optimal K-segment cooling cover.

In some cases, an optimal K-segment cover is readily visualized. For instance, control temperature sequence 2, shown in FIG. 18, is a 3-segment optimal heating cover of the comfort map represented, as no heating cover of exactly 3 segments can be constructed with less swept area without part of the cover residing in the set {C}. This cover satisfies the rule that the resulting control sequence avoid the set {C}, yet has the greatest potential for energy savings by virtue of the swept area metric.

Figure 19:
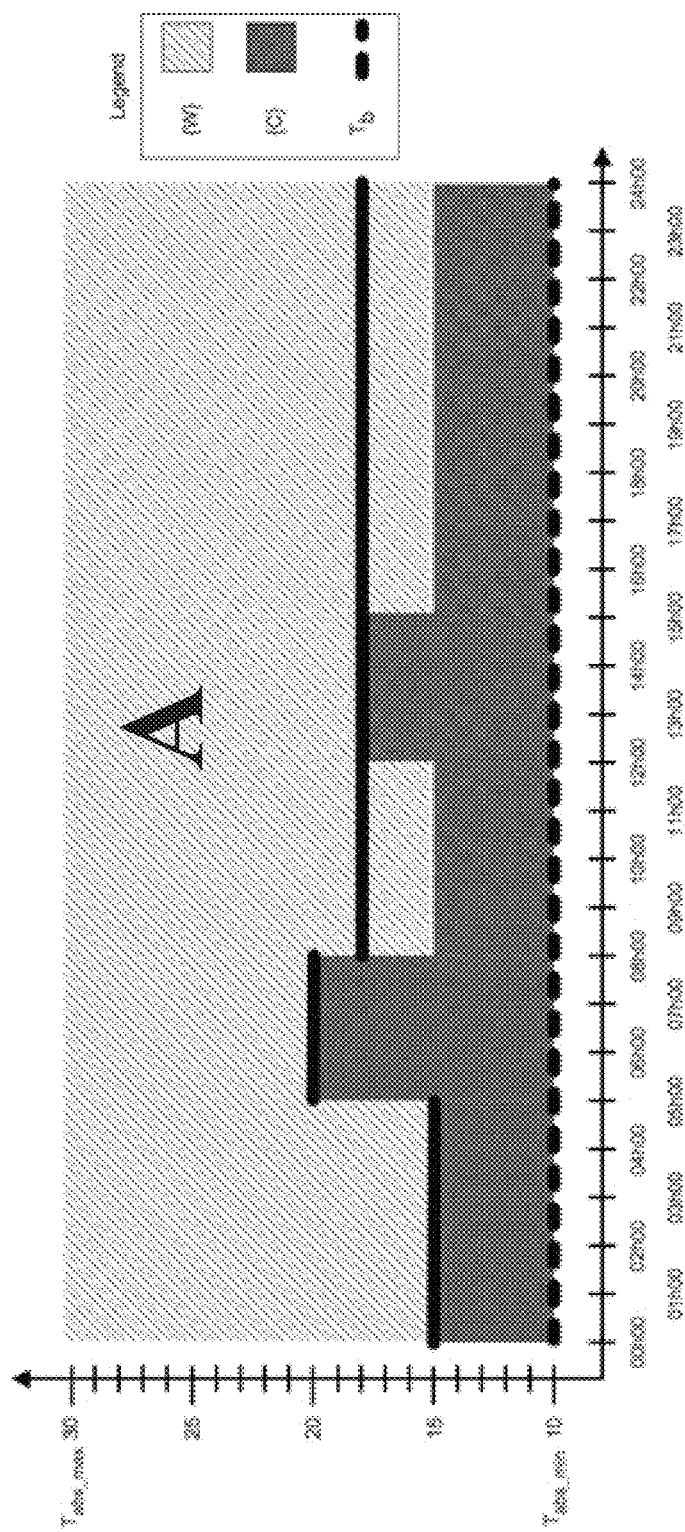
FIG. 19 shows a further comfort map, having a first configuration of a three-segment cover according to some embodiments.
Figure 20:
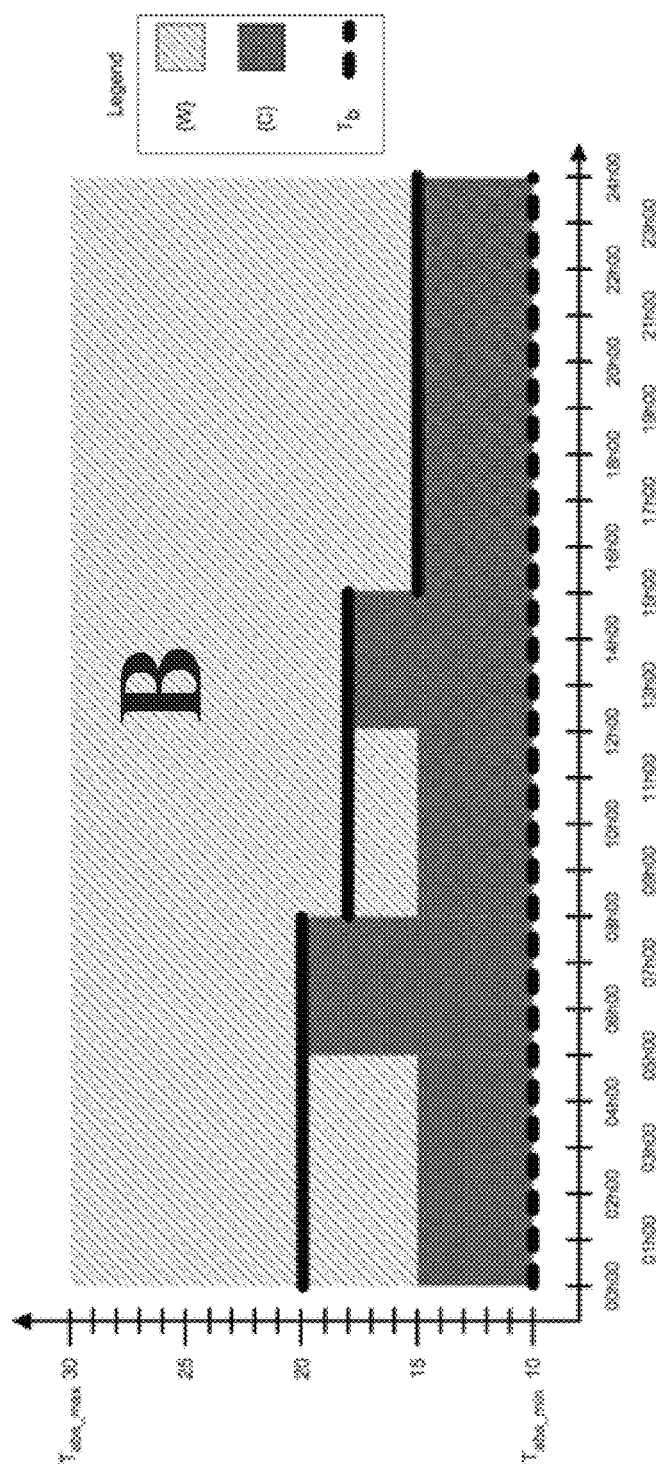
FIG. 20 shows the comfort map of FIG. 21, having a second configuration of a three-segment cover.
Figure 21:
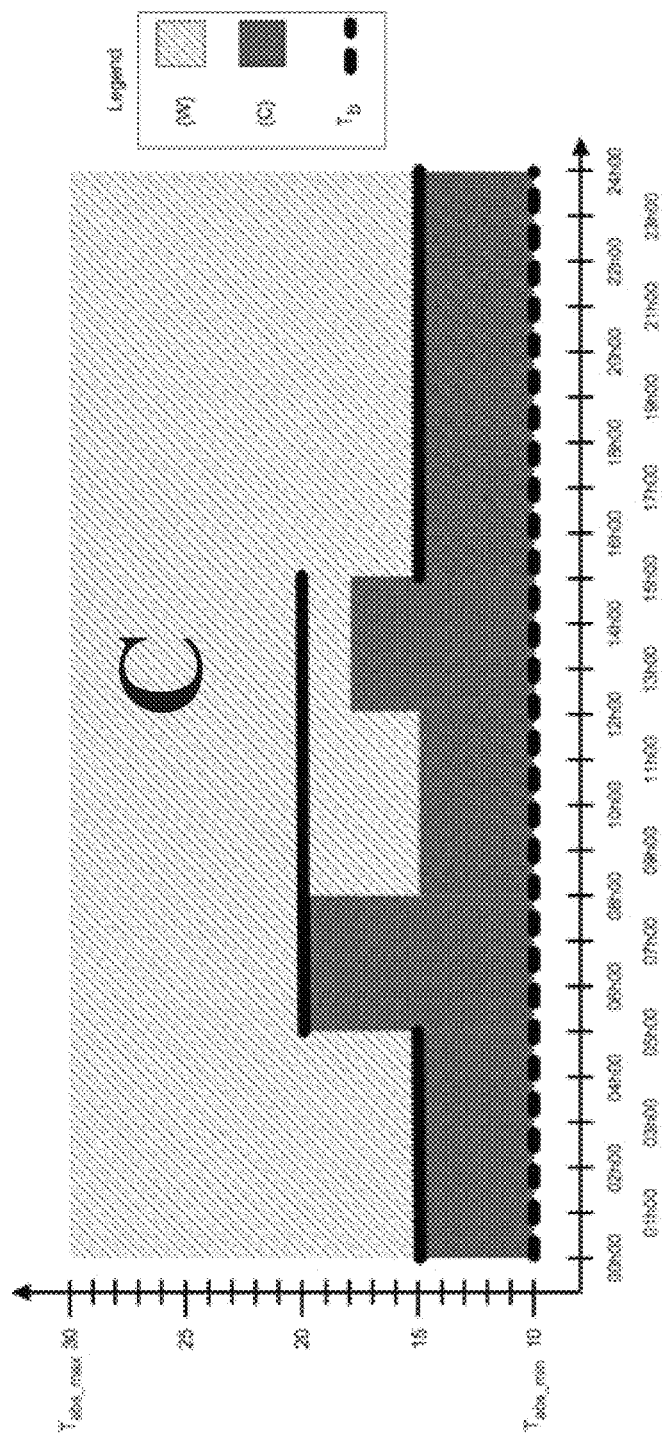
FIG. 21 shows the comfort map of FIG. 21, having a third configuration of a three-segment cover.

Other situations are less obvious, and in all cases, it is intended that a computer rather than a human determine the cover. FIGS. 19-21 show a more complex comfort map with three different potential 3-segment covers (of the many that could be constructed). It is not readily apparent, upon observation, which of these three proposed 3-segment covers has the smallest swept-area, nor is it apparent that any of these is a 3-segment "optimal" cover. The swept areas relative to a baseline temperature of 10° C. of the three 3-segment covers are presented in Table 1 below. From Table 1, it is seen that of the three covers, the cover shown in FIG. 21 has the smallest swept area and therefore likely has an energy-saving advantage over the other two covers.

TABLE 1

| Cover | Swept Area (deg C.-min) |
|---|---|
| A | 10,980 |
| B | 10,860 |
| C | 10,200 |

It can be shown mathematically that a necessary condition for a K-segment cover to be optimal is that each segment the K-segment cover must share at least one point of the thermal equilibrium boundary over the time range of the segment. Discovering an optimal K-segment cover generally requires a search algorithm. Computers are ideally suited to discover these covers via a search algorithm. Several types of search algorithm can be used, including an exhaustive search of all possible covers that can be optimal per above. Other methods, such as random walk, synthetic annealing and variants can be employed to attain a high probability of finding an optimal or near optimal cover within a finite number of iterations.

Ignoring other considerations, a K2-segment optimal cover would generally use less energy than a K1-segment optimal cover applied to the same comfort map, if the swept area of the 2-segment optimal cover is less than that of the K1-segment optimal cover, and the difference in swept area can be used as a guide to determine how many segments are appropriate for a given comfort map. For practical purposes, it is desirable to keep the number of segments to a minimum unless there is the potential for significant energy savings. Covers with short time segments may not provide much of an actual advantage when the thermodynamics of heating or cooling a space are taken into consideration. Also, many of the common strategies employed in regulating temperature in space heating or cooling do not respond well to quickly changing temperature set-points. Given a comfort map, the swept area metric can be useful to determine the appropriate number of segments to use.

For instance, if the K2 is greater than K1, for a given comfort map, one could choose to prefer a K2-segment optimal cover over a K1-segment optimal cover only if the K2-segment optimal cover has the potential to reduce energy consumption by a significant amount, say 2%. Using the 0.004%/deg C.-min heuristic from above, the swept area of the K2-segment optimal cover must be at least 500 deg C.-min less than that of the K1-segment optimal cover before the K2-segment optimal cover is chosen.

Figure 22:
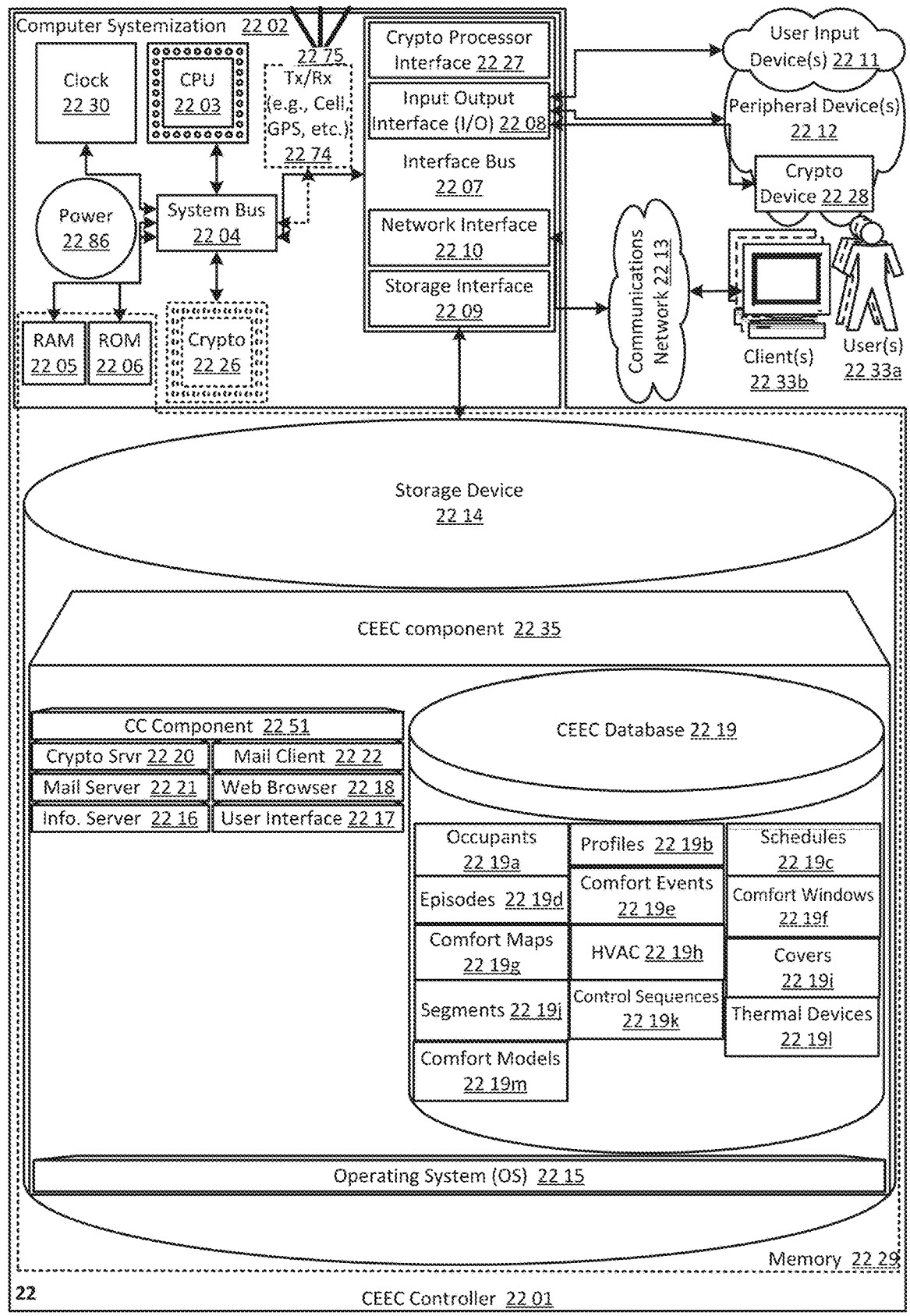
FIG. 22 shows a block diagram illustrating embodiments of a controller, according to some embodiments.

FIG. 22 shows a block diagram illustrating embodiments of a comfort and energy efficiency conformance ("CEEC") controller 2201 according to some embodiments. The controller CEEC 2201 may serve to aggregate, process, store, search, serve, identify, instruct, generate, match, and/or facilitate interactions with a computer through various technologies, and/or other related data.

Typically, users, e.g., 2233a, which may be people and/or other systems, may engage information technology systems (e.g., computers) to facilitate information processing. In turn, computers employ processors to process information; such processors 2203 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2229 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer, the operating system enables and facilitates users to access and operate computer information technology and resources. Some resources that may be employed in information technology systems include: input and output mechanisms through which data may pass into and out of a computer, memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the CEEC controller 2201 may be connected to and/or communicate with entities such as, but not limited to: one or more users from user input devices 2211; peripheral devices 2212; an optional cryptographic processor device 2228; and/or a communications network 2213. For example, the controller 2201 may be connected to and/or communicate with users, e.g., 2233a, operating client device(s), e.g., 2233b, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s), laptop computer(s), notebook(s), netbook(s), console(s), smart device(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The CEEC controller 2201 may be based on computer systems that may comprise, but are not limited to, components such as: a computer systemization 2202 connected to memory 2229.

A computer systemization 2202 may comprise a clock 2230, central processing unit ("CPU(s)" and/or "processor(s)" (these terms are used interchangeable throughout the disclosure unless noted to the contrary)) 2203, a memory 2229 (e.g., a read only memory (ROM) 2206, a random access memory (RAM) 2205, etc.), and/or an interface bus 2207, and most frequently, although not necessarily, are all interconnected and/or communicating through a system bus 2204 on one or more (mother)board(s) 2202 having conductive and/or otherwise transportive circuit pathways through which instructions (e.g., binary encoded signals) may travel to effectuate communications, operations, storage, etc. The computer systemization may be connected to a power source 2286; e.g., optionally the power source may be internal. Optionally, a cryptographic processor 2226 and/or transceivers (e.g., ICs) 2274 may be connected to the system bus. In another embodiment, the cryptographic processor and/or transceivers may be connected as either internal and/or external peripheral devices 2212 via the interface bus I/O. In turn, the transceivers may be connected to antenna(s) 2275, thereby effectuating wireless transmission and reception of various communication and/or sensor protocols; for example the antenna(s) may connect to: a Texas Instruments WiLink WL1283 transceiver chip (e.g., providing 802.11n, BLUETOOTH protocol 3.0, FM, global positioning system (GPS) (thereby allowing CEEC controller 2201 to determine its location)); Broadcom BCM4329FKUBG transceiver chip (e.g., providing 802.11n, BLUETOOTH protocol 2.1+EDR, FM, etc.); a Broadcom BCM4750IUB8 receiver chip (e.g., GPS); an Infincon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 2229 beyond the processor itself, internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the controller 2201 and beyond through various interfaces. Should processing requirements dictate a greater amount speed and/or capacity, distributed processors (e.g., Distributed CEEC Platform), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the CEEC may be achieved by implementing a microcontroller such as CAST's R8051XC2 microcontroller, Intel's MCS 51 (i.e., 8051 microcontroller); and/or the like. Also, to implement certain features of the CEEC, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the CEEC component collection (distributed or otherwise) and/or features may be implemented via the microprocessor and/or via embedded components; e.g., via ASIC, coprocessor, DSP, FPGA, and/or the like. Alternately, some implementations of the present disclosure may be implemented with embedded components that are configured and used to achieve a variety of features or signal processing.

Depending on the particular implementation, the embedded components may include software solutions, hardware solutions, and/or some combination of both hardware/software solutions. For example, features of the disclosure discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the features described herein. A hierarchy of programmable interconnects allow logic blocks to be interconnected as needed by the system designer/administrator, somewhat like a one-chip programmable breadboard. An FPGA's logic blocks can be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, embodiments of the disclosure may be developed on regular FPGAs and then migrated into a fixed version that more resembles ASIC implementations. Alternate or coordinating implementations may migrate controller 2201 features to a final ASIC instead of or in addition to FPGAs. Depending on the implementation all of the aforementioned embedded components and microprocessors may be considered the "CPU" and/or "processor" for the CEEC.

The power source 2286 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2286 is connected to at least one of the interconnected subsequent components of the CEEC, thereby providing an electric current to all subsequent components. In one example, the power source 2286 is connected to the system bus component 2204. In an alternative embodiment, an outside power source 2286 is provided through a connection across the I/O 2208 interface. For example, a USB and/or IEEE 1394 connection carries both data and power across the connection and is therefore a suitable source of power.

Interface bus(es) 2207 may accept, connect, and/or communicate to a number of interface adapters, conventionally although not necessarily in the form of adapter cards, such as but not limited to: input output interfaces (I/O) 2208, storage interfaces 2209, network interfaces 2210, and/or the like. Optionally, cryptographic processor interfaces 2227 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2209 may accept, communicate, and/or connect to a number of storage devices such as, but not limited to: storage devices 2214, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE), fiber channel, Small Computer Systems Interface (SCSI), Universal Serial Bus (USB), and/or the like.

Network interfaces 2210 may accept, communicate, and/or connect to a communications network 2213. Through a communications network 2213, the controller is accessible through remote clients 2233b (e.g., computers with web browsers) by users 2233a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed CEEC Platform), architectures may similarly be employed to pool, load balance, and/or otherwise increase the communicative bandwidth required by the CEEC controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 2210 may be used to engage with various communications network types 2213. For example, multiple network interfaces may be employed to allow for the communication over broadcast, multicast, and/or unicast networks.

Input Output interfaces (I/O) 2208 may accept, communicate, and/or connect to user input devices 2211, peripheral devices 2212, cryptographic processor devices 2228, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; BLUETOOTH protocol; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 2211 often are a type of peripheral device 2212 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 2212 may be connected and/or communicate to I/O and/or other facilities of the like such as network interfaces, storage interfaces, directly to the interface bus, system bus, the CPU, and/or the like. Peripheral devices may be external, internal and/or part of the CEEC controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 2228), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices can include types of input devices (e.g., cameras, smart watches).

It should be noted that although user input devices and peripheral devices may be employed, the CEEC controller may be embodied as an embedded, dedicated, and/or monitor-less (i.e., headless) device, wherein access would be provided over a network interface connection.

Cryptographic units such as, but not limited to, microcontrollers, processors 2226, interfaces 2227, and/or devices 2228 may be attached, and/or communicate with the CEEC controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor line, which is capable of performing 500+MB/s of cryptographic instructions; VLSI Technology's 33 MHz 6868; and/or the like.

Generally, any mechanization and/or embodiment allowing a processor to affect the storage and/or retrieval of information is regarded as memory 2229. However, memory is a fungible technology and resource, thus, any number of memory embodiments may be employed in lieu of or in concert with one another. It is to be understood that the CEEC controller and/or a computer systemization may employ various forms of memory 2229. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 2229 will include ROM 2206, RAM 2205, and a storage device 2214. A storage device 2214 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

The memory 2229 may contain a collection of program and/or database components and/or data such as, but not limited to: operating system component(s) 2215 (operating system); information server component(s) 2216 (information server); user interface component(s) 2217 (user interface); Web browser component(s) 2218 (Web browser); database(s) 2219; mail server component(s) 2221; mail client component(s) 2222; cryptographic server component(s) 2220 (cryptographic server); profile library manager ("PLM") component(s), comfort map manager ("CMM")

component, control temperature sequence generator ("CTSG") component (e.g., as detailed in U.S. patent application Ser. No. 14/956,082); and/or the like (i.e., collectively a component collection).

These components may be stored and accessed from the storage devices and/or from storage devices accessible through an interface bus. Although non-conventional program components such as those in the component collection, typically, are stored in a local storage device 2214, they may also be loaded and/or stored in memory such as: peripheral devices, RAM, remote storage facilities through a communications network, ROM, various forms of memory, and/or the like.

The operating system component 2215 is an executable program component facilitating the operation of the controller 2201. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 20002003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the CEEC controller to communicate with other entities through a communications network 2213. Various communication protocols may be used by the CEEC controller 2201 as a subcarrier transport mechanism for interaction, such as, but not limited to: multicast, TCP/IP, UDP, unicast, and/or the like.

An information server component 2216 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C # and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the CEEC controller based on the remainder of the HTrP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the CEEC database 2219, operating systems, other program components, user interfaces, Web browsers, and/or the like.

Access to the database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the CEEC. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the CEEC as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets)

similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XPNista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 2217 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

A Web browser component 2218 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the CEEC enabled nodes. The combined application may be nugatory on systems employing standard Web browsers.

A mail server component 2221 is a stored program component that is executed by a CPU 2203. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C # and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the system.

Access to the CEEC mail may be achieved through a number of APIs offered by the individual Web server components and/or the operating system.

Also, a mail server may contain, communicate, generate, obtain, and/or provide program component, system, user, and/or data communications, requests, information, and/or responses.

A mail client component 2222 is a stored program component that is executed by a CPU 2203. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

A cryptographic server component 2220 is a stored program component that is executed by a CPU 2203, cryptographic processor 2226, cryptographic processor interface 2227, cryptographic processor device 2228, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the CEEC may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the CEEC component to engage in secure transactions if so desired. The cryptographic component facilitates the secure accessing of resources on the system and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The CEEC database component 2219 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the CEEC database 2219 may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the CEEC database 2219 is implemented as a data-structure, the use of the CEEC database 2219 may be integrated into another component such as the component 2235. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 2219 includes several tables 2219a-m. An Occupants table 2219a may include fields such as, but not limited to: user_id, ssn, dob, first_name, last_name, age, state, address_firstline, address_secondline, zipcode, device_id, contact_info, contact_type, alt_contact_info, alt_contact_type, user_equipment, user_plane, user_profile, user_preferences, and/or the like. A Profiles table 2219b may include fields such as, but not limited to: profile_weekday, profile_weekend, profile_user, profile_holiday, temperature, time_of_day, day_of_week, and/or the like. A Schedules table 2219c may include fields such as, but not limited to: schedule_id, temp_1_value, temp_1_duration, and/or the like. An Episodes table 2219d may include fields such as, but not limited to: start_time, end_time, start_temp, end_temp, num_segments, map_id, user_id, last_update, and/or the like. A Comfort Events table 2219e may include fields such as, but not limited to: event_type, event_time, temp_observed, and/or the like. A Comfort Windows table 2219f may include fields such as, but not limited to: temp_min, temp_max, time_min, time_max, radius, set_membership, map_id, and/or the like. A Comfort Maps table 2219g may include fields such as, but not limited to: map_id, last_edited, user_id, episode_ref, num_segments, optimiz_type, and/or the like. An HVAC table 2219h may include fields such as, but not limited to: serial_num, model, password, connection_type, thermostat, ctrl_voltage, max_current, max_surge_current, ctrl_accuracy, temp_ctrl_range, max_temp, min_temp, oper_range, humid_ctrl, and/or the like. A Covers table 2219i may include fields such as, but not limited to: segment_number, segment_position, efficiency_threshold, comfort_map_id, and/or the like. A Segments table 2219j may include fields such as, but not limited to: seg_id, seg_length, episode_id, comfort_map_id, and/or the like. A Control Sequences table 2219k may include fields such as, sequence_id, temp_setpoint, seq_length, comfort_map_id, episode_id, and/or the like. A Thermal Devices table 22191 may include fields such as, but not limited to: device_factory_data, cool_comfort_temp, cool_limit_temp, device_temp, hold_param, power_set, temp_rate, update_period, and/or the like. A Comfort Models table 2219k may include fields such as, but not limited to: factory_comfort_model, eval_date_time, minus_cevent, plus_event, profile_date_time, update_event, comfort_duration, cool_comfort_temp, cool_limit_temp, device_temp, hold_param, humidity, update_period, and/or the like.

In one embodiment, the CEEC database 2219 may interact with other database systems. For example, employing a distributed database system, queries and data access by a search CEEC component may treat the combination of the database, an integrated data security layer database as a single database entity.

In one embodiment, user programs may contain various user interface primitives, which may serve to update the CEEC. Also, various accounts may require custom database tables depending upon the environments and the types of clients the CEEC may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2219a-m. The CEEC may be configured to keep track of various settings, inputs, and parameters via database controllers.

The CEEC database 2219 may communicate to and/or with other components in a component collection, including itself, and/or facilities of the like. Most frequently, the CEEC database 2219 communicates with the CEEC component, other program components, and/or the like. The database may contain, retain, and provide information regarding other nodes and data.

The CEEC component 2235 is a stored program component that is executed by a CPU. In one embodiment, the CEEC component 2235 incorporates any and/or all combinations of the aspects of the CEEC system discussed in the previous figures. As such, the CEEC system affects accessing, obtaining and the provision of information, services, transactions, and/or the like across various communications networks.

The CEEC component 2235 transforms reference temperature setpoint or comfort map input via CEEC components into segments, covers, modified temperature setpoint trajectories, and/or the like. In one embodiment, the component 2235 takes reference temperature setpoint schedule data and transforms the input, via various components (e.g., cover classifier ("CC") component 2251, and/or the like), into outputs (e.g., comfort event windows, comfort maps, reference temperature setpoint trajectories and/or the like).

The CEEC component 2235 enabling access of information between nodes may be developed by employing standard development tools and languages such as, but not limited to: Apache components, Assembly, ActiveX, binary executables, (ANSI) (Objective-) C (++), C # and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the CEEC server employs a cryptographic server to encrypt and decrypt communications. The CEEC component may communicate to and/or with other components in a component collection, including itself, and/or facilities of the like. Most frequently, the CEEC component 2235 communicates with the CEEC database 2219, operating systems, other program components, and/or the like. The CEEC may contain, communicate, generate, obtain, and/or provide program component, system, user, and/or data communications, requests, and/or responses.

The structure and/or operation of any of the CEEC node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the CEEC controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the CEEC controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create (AF_INET, SOCK_STREAM, 0);
socket_bind($sock, $address, $port) or die('Could not bind to
address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); //
access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm
    .IBMDI.doc/referenceguide295.htm and other parser implementations:

http://publib.boulder.ibm.com/infocenter/tivihelp/v2r1/index.jsp?topic=/com.ibm
    .IBMDI.doc/referenceguide259.htm all of which are hereby expressly incorporated by reference herein.

In order to address various issues and advance the art, the entirety of this application for Apparatuses, Methods and Systems for Comfort and Energy Efficiency Conformance in an HVAC System (including the Cover Page, Title, Headings, Field, Background, Summary, Brief Description of the Drawings, Detailed Description, Claims, Abstract, Figures, Appendices and/or otherwise) shows by way of illustration various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a CEEC individual and/or enterprise user, database configuration and/or relational model, data type, data transmission and/or network framework, syntax structure, and/or the like, various embodiments of the CEEC may be implemented that enable a great deal of flexibility and customization. For example, aspects of the CEEC may be adapted for integration with flight planning and route optimization. While various embodiments and discussions of the CEEC have been directed to HVAC control, however, it is to be understood that the embodiments described herein may be readily configured and/or customized for a wide variety of other applications and/or implementations.

What is claimed is:

1. A processor-implemented method of controlling a Heating, Ventilation and Air Conditioning (HVAC) system, the method comprising:
accessing comfort map data from a comfort map that includes time, temperature, and comfort characteristic data for a comfort map episode;
defining a basis temperature according to at least one of:
(a) a heating basis temperature sequence $T_{HB}(n)$ that specifies minimum operating temperatures when the HVAC system is operating in a heating mode, and
(b) a cooling basis temperature sequence $T_{CB}(n)$ that specifies maximum operating temperatures when the HVAC system is operating in a cooling mode;
developing a proposed cover that meets one or more comfort characteristic set rules;
determining a swept area metric for the proposed cover, the swept area metric being an area between the proposed cover and the basis temperature on the comfort map for the comfort map episode;
iteratively developing additional proposed covers that meet the one or more comfort characteristic set rules;
determining a plurality of swept area metrics for the additional proposed covers, the swept area metric being an area between the respective additional proposed cover and the basis temperature on the comfort map for the comfort map;
determining an optimal proposed cover by comparing the swept area metric for the proposed cover and the plurality of swept area metrics for the additional proposed covers to determine which proposed cover has a highest-rated corresponding swept area metric;
generating an execution temperature trajectory from the optimal proposed cover; and
executing the temperature trajectory using the HVAC system,
the method further comprising iterating a dual-stage proposed cover optimization process until a stopping case is reached.

2. The method of claim 1, further comprising:
identifying a current operational mode of the HVAC system; and
defining comfort map data for the comfort map episode based on the current operational mode, wherein the comfort map data includes a Thermal Equilibrium Boundary (TEB), a cool element set, a warm element set, or one or more comfort characteristic set rules for the comfort map episode.

3. The method of claim 1, wherein the comfort characteristic set rules are accessed and implemented based on a current HVAC operational mode.

4. The method of claim 1, further comprising:
selecting a proposed cover sequence of constant-temperature cover segments for the proposed covers defined in a cool element set of the comfort map data for the comfort map episode when a current HVAC operational mode is cooling; or
selecting a proposed cover sequence of constant-temperature cover segments for the proposed covers defined in a warm element set of the comfort map data for the comfort map episode when a current HVAC operational mode is heating.

5. The method of claim 4, wherein a first optimization stage for each proposed cover sequence in a search set associated with a constant-temperature cover segment number (n) comprises:
developing a proposed cover sequence for a cover segment (n);
measuring a swept area of the developed proposed cover sequence;
comparing the measured swept area with a current highest rated swept area for the cover segment number (n);
storing the developed proposed cover sequence as an optimal proposed cover sequence and updating a current highest rated swept area if the measured swept area is less than the current highest rated swept area; and
shifting to a next proposed cover sequence for the cover segment number (n) until each member of the search set is analyzed and a stopping case is reached to determine an optimal cover sequence for the cover segment number (n).

6. The method of claim 5, wherein a second optimization stage comprises:
incrementing the cover segment number (n) to analyze a next cover segment number until the cover segment number (n) is equal to a maximum number of cover segments;
repeating the optimization analysis for a specific cover segment number; and
selecting a proposed cover sequence that has a highest rated swept area as a proposed cover sequence number for generating an execution temperature trajectory.

7. The method according to claim 6, wherein the swept area for each proposed cover sequence is adjusted using a weighting measure.

8. The method of claim 7, wherein the weighting measure is based on a segment distance from a Thermal Equilibrium Boundary (TEB) at a given time.

9. The method of claim 7, wherein the weighting measure is achieved by applying a root square to the distance from a Thermal Equilibrium Boundary (TEB) defined for the comfort map episode at a given time.

10. The method of claim 7, wherein the weighting measure is based on a cost of energy across the constant-temperature cover segments for the comfort map episode.

11. The method of claim 7, wherein the weighting measure is based on a set membership at a Thermal Equilibrium Boundary (TEB) defined for the comfort map episode.

12. A method of controlling a Heating, Ventilation and Air Conditioning (HVAC) system, the method comprising:
accessing a comfort map, the comfort map being defined by a first boundary, in a time-temperature parameter space, the first boundary including:
an upper temperature region, the upper temperature region comprising an upper temperature area, the upper temperature area being defined by the first boundary, an upper limit, and an episode duration, and
a lower temperature region, the lower temperature region comprising a lower temperature area, the lower temperature area being defined by the first boundary, a lower limit, and the episode duration;
determining proposed cover sequences of constant-temperature cover segments for proposed covers defined in cool or warm element sets of the accessed comfort map for an episode, the constant-temperature cover segments being configured to define a second, discontinuous boundary, in the time-temperature parameter space, the discontinuous boundary including:
a first area between the second boundary and the upper limit of the upper temperature region, the first area being greater compared to the upper temperature area of the upper temperature region when the HVAC system operates in a cooling mode, or
a second area between the second boundary and the lower limit of the lower temperature region, the second area being greater compared to the lower temperature area of the lower temperature region when the HVAC system operates in a heating mode;
determining a plurality of swept area metrics for a proposed cover sequences, the swept area metric being an area between the respective proposed cover sequence and a basis temperature on the comfort map, the basis temperature defined according to at least one of:
(a) a heating basis temperature sequence $T_{HB}(n)$ specifies minimum operating temperatures when the HVAC system is operating in a heating mode, and
(b) a cooling basis temperature sequence $T_{CB}(n)$ specifies maximum operating temperatures when the HVAC system is operating in a cooling mode;
determining an optimal proposed cover sequence by determining which proposed cover sequence has a highest-rated corresponding swept area metric in the plurality of swept area metrics; and
controlling the HVAC system according to a temperature trajectory, the temperature trajectory being generated based on the determined optimal cover sequence of constant-temperature cover segments,
the method further comprising iterating a dual-stage proposed cover optimization process until a stopping case is reached.

13. A Heating, Ventilation and Air Conditioning (HVAC) system control apparatus, the control apparatus comprising:
a processor; and
a memory disposed in communication with the processor and storing processor-issuable instructions to:
accessing comfort map data from a comfort map that includes time, temperature, and comfort characteristic data for a comfort map episode;
define a basis temperature according to at least one of:
(a) a heating basis temperature sequence $T_{HB}(n)$ specifies minimum operating temperatures when the HVAC system is operating in a heating mode, and
(b) a cooling basis temperature sequence $T_{CB}(n)$ specifies maximum operating temperatures when the HVAC system is operating in a cooling mode;
develop a proposed cover that complies with comfort characteristic set rules;
determine a swept area metric for the proposed cover, the swept area metric being an area between the proposed cover and the basis temperature on the comfort map for the comfort map episode;
iteratively develop additional proposed covers that comply with comfort characteristic set rules;
determine a plurality of swept area metrics for the additional proposed covers, the swept area metric being an area between a respective additional proposed cover and the basis temperature on the comfort map for the comfort map episode;
determine an optimal proposed cover by comparing the swept area metric for the proposed cover and the plurality of swept area metrics for the additional proposed covers to determine which proposed cover has a highest-rated corresponding swept area metric;
generate an execution temperature trajectory from the optimal proposed cover; and
execute the temperature trajectory via an HVAC system,
wherein the memory in communication with the processor and using the processor-issuable instructions is further configured to iterate a dual stage proposed cover optimization process until a stopping case is reached.

14. The apparatus of claim 13, further comprising instructions to:
identify a current HVAC operational mode; and
define comfort map data for the comfort map episode based on the current HVAC operational mode, wherein the comfort map data includes a Thermal Equilibrium Boundary (TEB), a cool element set, a warm element set, or comfort characteristic set rules for the comfort map episode.

15. The apparatus of claim 13, wherein the comfort characteristic set rules are accessed and implemented based on a current HVAC operational mode.

16. The apparatus of claim 13, wherein the memory in communication with the processor and using the processor-issuable instructions is further configured to:
select a proposed cover sequence of constant-temperature cover segments for the proposed covers defined in a cool element set of the comfort map data for the comfort map episode when a current HVAC operational mode is cool; or
select a proposed cover sequence of constant-temperature cover segments for the proposed covers defined in a warm element set of the comfort map data for the comfort map episode when a current HVAC operational mode is heat.

17. The apparatus of claim 16, wherein a first optimization stage for each proposed cover sequence in a search set associated with a constant-temperature cover segment number (n) includes instructions to:
develop a proposed cover sequence for a cover segment number (n);
measure a swept area of the developed proposed cover sequence;
compare the measured swept area with a current highest rated swept area for the cover segment number (n);
store the developed proposed cover sequence as an optimal proposed cover sequence and update a current highest rated swept area if the measured swept area is less than the current highest rated swept area; and
shift to a next proposed cover sequence for the cover segment number (n) until each member of the search set is analyzed and a stopping case is reached to determine an optimal cover sequence for the cover segment number (n).

18. The apparatus of claim 17, wherein a second optimization stage for each proposed cover sequence in a search set associated with a constant-temperature cover segment number (n) includes instructions to:
increment the cover segment number (n) to analyze a next cover segment number until the cover segment number (n) is equal to a maximum number of cover segments;
repeat the optimization analysis for a specific cover segment number; and
select a proposed cover sequence that has a highest rated swept area as a proposed cover sequence number to generate an execution temperature trajectory.

19. The apparatus according to claim 18, wherein the swept area for each proposed cover sequence is adjusted using a weighting measure.

20. The apparatus of claim 19, wherein the weighting measure is based on a segment distance from a Thermal Equilibrium Boundary (TEB) at a given time.

21. The apparatus of claim 19, wherein the weighting measure is achieved by applying a root square to the distance from a Thermal Equilibrium Boundary (TEB) defined for the comfort map episode at a given time.

22. The apparatus of claim 19, wherein the weighting measure is based on a cost of energy across the constant-temperature cover segments for the comfort map episode.

23. The apparatus of claim 19, wherein the weighting measure is based on a set membership at a Thermal Equilibrium Boundary (TEB) defined for the comfort map episode.

* * * * *